US009267330B2

(12) United States Patent
Rinzler et al.

(10) Patent No.: US 9,267,330 B2
(45) Date of Patent: Feb. 23, 2016

(54) LONG DISTANCE HIGH POWER OPTICAL LASER FIBER BREAK DETECTION AND CONTINUITY MONITORING SYSTEMS AND METHODS

(75) Inventors: Charles C. Rinzler, Denver, CO (US); William C. Gray, Parker, CO (US); Brian O. Faircloth, Evergreen, CO (US); Mark S. Zediker, Castle Rock, CO (US)

(73) Assignee: FORO ENERGY, INC., Houston, TX (US)

( * ) Notice: Subject to any disclaimer, the term of this patent is extended or adjusted under 35 U.S.C. 154(b) by 169 days.

(21) Appl. No.: 13/403,723

(22) Filed: Feb. 23, 2012

(65) Prior Publication Data

US 2012/0273269 A1    Nov. 1, 2012

Related U.S. Application Data

(63) Continuation-in-part of application No. 12/544,136, filed on Aug. 19, 2009, now Pat. No. 8,511,401.

(60) Provisional application No. 61/090,384, filed on Aug. 20, 2008, provisional application No. 61/102,730, (Continued)

(51) Int. Cl.
  *E21B 7/14*      (2006.01)
  *G01M 5/00*      (2006.01)
  *G01M 11/00*     (2006.01)

(52) U.S. Cl.
  CPC .............. *E21B 7/14* (2013.01); *G01M 5/0025* (2013.01); *G01M 5/0033* (2013.01); *G01M 5/0091* (2013.01); *G01M 11/35* (2013.01)

(58) Field of Classification Search
  CPC ........... E21B 47/123; E21B 7/14; E21B 7/15; B23K 26/032; B23K 26/381; G01V 8/16; G02M 6/2551; G02M 6/26; G02M 6/4286; G01K 11/3206; G01M 11/3109; G01M 11/3172; G01M 11/3163; G01M 11/3145
  USPC .......... 166/255.1, 250.8, 242.8, 65.1; 175/40, 175/57, 11, 15, 16; 219/121.7, 121.72; 385/100; 372/4
  See application file for complete search history.

(56) References Cited

U.S. PATENT DOCUMENTS

| 914,636 A | 3/1909 | Case |
| 2,548,463 A | 4/1951 | Blood |

(Continued)

FOREIGN PATENT DOCUMENTS

| EP | 0 295 045 A2 | 12/1988 |
| EP | 0 515 983 A1 | 12/1992 |

(Continued)

OTHER PUBLICATIONS

U.S. Appl. No. 12/543,986, filed Aug. 19, 2013, Moxley et al.

(Continued)

*Primary Examiner* — Jennifer H Gay
(74) *Attorney, Agent, or Firm* — Brian Fahrenbach; Steptoe & Johnson

(57) ABSTRACT

A monitoring and detection system for use on high power laser systems, long distance high power laser systems and tools for performing high power laser operations. In particular, the monitoring and detection systems provide break detection and continuity protection for performing high power laser operations on, and in, remote and difficult to access locations.

17 Claims, 6 Drawing Sheets

Related U.S. Application Data filed on Oct. 3, 2008, provisional application No. 61/106,472, filed on Oct. 17, 2008, provisional application No. 61/153,271, filed on Feb. 17, 2009, provisional application No. 61/446,047, filed on Feb. 24, 2011, provisional application No. 61/446,412, filed on Feb. 24, 2011, provisional application No. 61/446,312, filed on Feb. 24, 2011.

(56) References Cited

U.S. PATENT DOCUMENTS

| | | |
|---|---|---|
| 2,742,555 A | 4/1956 | Murray |
| 3,122,212 A | 2/1964 | Karlovitz |
| 3,383,491 A | 5/1968 | Muncheryan |
| 3,461,964 A | 8/1969 | Venghiattis |
| 3,493,060 A | 2/1970 | Van Dyk |
| 3,503,804 A | 3/1970 | Schneider et al. |
| 3,539,221 A | 11/1970 | Gladstone |
| 3,544,165 A | 12/1970 | Snedden |
| 3,556,600 A | 1/1971 | Shoupp et al. |
| 3,574,357 A | 4/1971 | Alexandru et al. |
| 3,586,413 A | 6/1971 | Adams |
| 3,652,447 A | 3/1972 | Yant |
| 3,693,718 A | 9/1972 | Stout |
| 3,699,649 A | 10/1972 | McWilliams |
| 3,802,203 A | 4/1974 | Ichise et al. |
| 3,820,605 A | 6/1974 | Barber et al. |
| 3,821,510 A | 6/1974 | Muncheryan |
| 3,823,788 A | 7/1974 | Garrison et al. |
| 3,871,485 A | 3/1975 | Keenan, Jr. |
| 3,882,945 A | 5/1975 | Keenan, Jr. |
| 3,938,599 A | 2/1976 | Horn |
| 3,960,448 A | 6/1976 | Schmidt et al. |
| 3,977,478 A | 8/1976 | Shuck |
| 3,992,095 A | 11/1976 | Jacoby et al. |
| 3,998,281 A | 12/1976 | Salisbury et al. |
| 4,019,331 A | 4/1977 | Rom et al. |
| 4,025,091 A | 5/1977 | Zeile, Jr. |
| 4,026,356 A | 5/1977 | Shuck |
| 4,047,580 A | 9/1977 | Yahiro et al. |
| 4,057,118 A | 11/1977 | Ford |
| 4,061,190 A | 12/1977 | Bloomfield |
| 4,066,138 A | 1/1978 | Salisbury et al. |
| 4,090,572 A | 5/1978 | Welch |
| 4,113,036 A | 9/1978 | Stout |
| 4,125,757 A | 11/1978 | Ross |
| 4,151,393 A | 4/1979 | Fenneman et al. |
| 4,162,400 A | 7/1979 | Pitts, Jr. |
| 4,189,705 A | 2/1980 | Pitts, Jr. |
| 4,194,536 A | 3/1980 | Stine et al. |
| 4,199,034 A | 4/1980 | Salisbury et al. |
| 4,227,582 A | 10/1980 | Price |
| 4,228,856 A | 10/1980 | Reale |
| 4,243,298 A | 1/1981 | Kao et al. |
| 4,249,925 A | 2/1981 | Kawashima et al. |
| 4,252,015 A | 2/1981 | Harbon et al. |
| 4,256,146 A | 3/1981 | Genini et al. |
| 4,266,609 A | 5/1981 | Rom et al. |
| 4,280,535 A | 7/1981 | Willis |
| 4,281,891 A | 8/1981 | Shinohara et al. |
| 4,282,940 A | 8/1981 | Salisbury et al. |
| 4,311,142 A * | 1/1982 | Machida ................. 606/12 |
| 4,332,401 A | 6/1982 | Stephenson et al. |
| 4,336,415 A | 6/1982 | Walling |
| 4,340,245 A | 7/1982 | Stalder |
| 4,367,917 A | 1/1983 | Gray |
| 4,370,886 A | 2/1983 | Smith, Jr. et al. |
| 4,374,530 A | 2/1983 | Walling |
| 4,375,164 A | 3/1983 | Dodge et al. |
| 4,389,645 A | 6/1983 | Wharton |
| 4,391,517 A * | 7/1983 | Zucker ............... G01M 11/35 250/227.11 |
| 4,415,184 A | 11/1983 | Stephenson et al. |
| 4,417,603 A | 11/1983 | Argy |
| 4,436,177 A | 3/1984 | Elliston |
| 4,444,420 A | 4/1984 | McStravick et al. |
| 4,453,570 A | 6/1984 | Hutchison |
| 4,459,731 A | 7/1984 | Hutchison |
| 4,477,106 A | 10/1984 | Hutchison |
| 4,504,112 A | 3/1985 | Gould et al. |
| 4,522,464 A | 6/1985 | Thompson et al. |
| 4,531,552 A | 7/1985 | Kim |
| 4,565,351 A | 1/1986 | Conti et al. |
| 4,662,437 A | 5/1987 | Renfro |
| 4,694,865 A | 9/1987 | Tauschmann |
| 4,725,116 A | 2/1988 | Spencer et al. |
| 4,741,405 A | 5/1988 | Moeny et al. |
| 4,744,420 A | 5/1988 | Patterson et al. |
| 4,770,493 A | 9/1988 | Ara et al. |
| 4,793,383 A | 12/1988 | Gyory et al. |
| 4,812,641 A * | 3/1989 | Ortiz, Jr. .................... 250/205 |
| 4,830,113 A | 5/1989 | Geyer |
| 4,860,654 A | 8/1989 | Chawla et al. |
| 4,860,655 A | 8/1989 | Chawla |
| 4,872,520 A | 10/1989 | Nelson |
| 4,883,054 A * | 11/1989 | Fuller et al. ................... 606/12 |
| 4,924,870 A | 5/1990 | Wlodarczyk et al. |
| 4,931,771 A * | 6/1990 | Kahn ......................... 340/556 |
| 4,952,771 A | 8/1990 | Wrobel |
| 4,989,236 A | 1/1991 | Myllymäki |
| 4,997,250 A | 3/1991 | Ortiz, Jr. |
| 5,003,144 A | 3/1991 | Lindroth et al. |
| 5,004,166 A | 4/1991 | Sellar |
| 5,033,545 A | 7/1991 | Sudol |
| 5,049,738 A | 9/1991 | Gergely et al. |
| 5,084,617 A | 1/1992 | Gergely |
| 5,086,842 A | 2/1992 | Cholet |
| 5,104,391 A * | 4/1992 | Ingle et al. ..................... 606/11 |
| 5,107,936 A | 4/1992 | Foppe |
| 5,121,872 A | 6/1992 | Legget |
| 5,125,061 A | 6/1992 | Marlier et al. |
| 5,125,063 A | 6/1992 | Panuska et al. |
| 5,128,882 A | 7/1992 | Cooper et al. |
| 5,140,664 A | 8/1992 | Bosisio et al. |
| 5,163,321 A | 11/1992 | Perales |
| 5,168,940 A | 12/1992 | Foppe |
| 5,172,112 A | 12/1992 | Jennings |
| 5,194,847 A * | 3/1993 | Taylor et al. ................ 340/557 |
| 5,212,755 A | 5/1993 | Holmberg |
| 5,219,345 A * | 6/1993 | Potter ............................ 606/15 |
| 5,269,377 A | 12/1993 | Martin |
| 5,285,204 A | 2/1994 | Sas-Jaworsky |
| 5,319,195 A * | 6/1994 | Jones et al. ............... 250/227.11 |
| 5,348,097 A | 9/1994 | Giannesini et al. |
| 5,351,533 A | 10/1994 | Macadam et al. |
| 5,353,875 A | 10/1994 | Schultz et al. |
| 5,355,967 A | 10/1994 | Mueller et al. |
| 5,356,081 A | 10/1994 | Sellar |
| 5,396,805 A | 3/1995 | Surjaatmadja |
| 5,411,081 A | 5/1995 | Moore et al. |
| 5,411,085 A | 5/1995 | Moore et al. |
| 5,411,105 A | 5/1995 | Gray |
| 5,413,045 A * | 5/1995 | Miszewski ................... 102/201 |
| 5,413,170 A | 5/1995 | Moore |
| 5,419,188 A | 5/1995 | Rademaker et al. |
| 5,423,383 A | 6/1995 | Pringle |
| 5,425,420 A | 6/1995 | Pringle |
| 5,435,351 A | 7/1995 | Head |
| 5,435,395 A | 7/1995 | Connell |
| 5,463,711 A | 10/1995 | Chu |
| 5,465,793 A | 11/1995 | Pringle |
| 5,469,878 A | 11/1995 | Pringle |
| 5,479,860 A | 1/1996 | Ellis |
| 5,483,988 A | 1/1996 | Pringle |
| 5,488,992 A | 2/1996 | Pringle |
| 5,500,730 A * | 3/1996 | Johnson ....................... 356/73.1 |
| 5,500,768 A | 3/1996 | Doggett et al. |
| 5,503,014 A | 4/1996 | Griffith |
| 5,503,370 A | 4/1996 | Newman et al. |
| 5,505,259 A | 4/1996 | Wittrisch et al. |
| 5,515,926 A | 5/1996 | Boychuk |
| 5,526,887 A | 6/1996 | Vestavik |
| 5,561,516 A | 10/1996 | Noble et al. |

(56) References Cited

U.S. PATENT DOCUMENTS

| | | |
|---|---|---|
| 5,566,764 A | 10/1996 | Elliston |
| 5,573,225 A | 11/1996 | Boyle et al. |
| 5,577,560 A | 11/1996 | Coronado et al. |
| 5,586,609 A | 12/1996 | Schuh |
| 5,599,004 A | 2/1997 | Newman et al. |
| 5,615,052 A | 3/1997 | Doggett |
| 5,638,904 A | 6/1997 | Misselbrook et al. |
| 5,655,745 A | 8/1997 | Morrill |
| 5,694,408 A | 12/1997 | Bott et al. |
| 5,707,939 A | 1/1998 | Patel |
| 5,757,484 A | 5/1998 | Miles et al. |
| 5,759,859 A | 6/1998 | Sausa |
| 5,771,984 A | 6/1998 | Potter et al. |
| 5,773,791 A | 6/1998 | Kuykendal |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,896,482 A | 4/1999 | Blee et al. |
| 5,896,938 A | 4/1999 | Moeny et al. |
| 5,902,499 A | 5/1999 | Richerzhagen |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,966,206 A * | 10/1999 | Jander .......................... 356/73.1 |
| 5,973,783 A | 10/1999 | Goldner et al. |
| 5,986,756 A | 11/1999 | Slater et al. |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,166,546 A | 12/2000 | Scheihing et al. |
| 6,215,734 B1 | 4/2001 | Moeny et al. |
| 6,227,200 B1 | 5/2001 | Cunningham et al. |
| 6,250,391 B1 | 6/2001 | Proudfoot |
| 6,271,766 B1 * | 8/2001 | Didden et al. .............. 340/853.1 |
| 6,273,193 B1 | 8/2001 | Hermann et al. |
| 6,273,621 B1 * | 8/2001 | Eslambolchi ........ G02B 6/2558 385/135 |
| 6,275,645 B1 | 8/2001 | Vereecken et al. |
| 6,281,489 B1 | 8/2001 | Tubel et al. |
| 6,301,423 B1 | 10/2001 | Olson |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,355,928 B1 | 3/2002 | Skinner et al. |
| 6,356,683 B1 | 3/2002 | Hu et al. |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,426,479 B1 | 7/2002 | Bischof |
| 6,437,326 B1 | 8/2002 | Yamate et al. |
| 6,450,257 B1 | 9/2002 | Douglas |
| 6,494,259 B2 | 12/2002 | Surjaatmadja |
| 6,497,290 B1 | 12/2002 | Misselbrook et al. |
| 6,557,249 B1 | 5/2003 | Pruett et al. |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,644,848 B1 | 11/2003 | Clayton et al. |
| 6,661,815 B1 | 12/2003 | Kozlovsky et al. |
| 6,710,720 B2 | 3/2004 | Carstensen et al. |
| 6,712,150 B1 | 3/2004 | Crabtree et al. |
| 6,725,924 B2 | 4/2004 | Davidson et al. |
| 6,747,743 B2 | 6/2004 | Skinner et al. |
| 6,753,520 B2 * | 6/2004 | Spirin et al. .............. 250/227.16 |
| 6,755,262 B2 | 6/2004 | Parker |
| 6,808,023 B2 | 10/2004 | Smith et al. |
| 6,832,654 B2 | 12/2004 | Ravensbergen et al. |
| 6,847,034 B2 | 1/2005 | Shah et al. |
| 6,851,488 B2 | 2/2005 | Batarseh |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 | 4/2005 | Batarseh |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,040,746 B2 | 5/2006 | McCain et al. |
| 7,055,604 B2 | 6/2006 | Jee et al. |
| 7,055,629 B2 | 6/2006 | Oglesby |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |
| 7,147,064 B2 | 12/2006 | Batarseh et al. |
| 7,152,700 B2 | 12/2006 | Church et al. |
| 7,163,875 B2 | 1/2007 | Richerzhagen |
| 7,172,026 B2 | 2/2007 | Misselbrook |
| 7,172,038 B2 | 2/2007 | Terry et al. |
| 7,174,067 B2 | 2/2007 | Murshid et al. |
| 7,188,687 B2 | 3/2007 | Rudd et al. |
| 7,195,731 B2 | 3/2007 | Jones |
| 7,196,786 B2 | 3/2007 | DiFoggio |
| 7,199,869 B2 | 4/2007 | MacDougall |
| 7,201,222 B2 | 4/2007 | Kanady et al. |
| 7,210,343 B2 | 5/2007 | Shammai et al. |
| 7,212,283 B2 | 5/2007 | Hother et al. |
| 7,249,633 B2 | 7/2007 | Ravensbergen et al. |
| 7,264,057 B2 | 9/2007 | Rytlewski et al. |
| 7,270,195 B2 | 9/2007 | MacGregor et al. |
| 7,273,108 B2 | 9/2007 | Misselbrook |
| 7,296,940 B2 * | 11/2007 | Shukunami et al. ............ 385/96 |
| 7,334,637 B2 | 2/2008 | Smith, Jr. |
| 7,337,660 B2 | 3/2008 | Ibrahim et al. |
| 7,362,422 B2 | 4/2008 | DiFoggio et al. |
| 7,372,230 B2 | 5/2008 | McKay |
| 7,394,064 B2 | 7/2008 | Marsh |
| 7,395,696 B2 | 7/2008 | Bissonnette et al. |
| 7,416,032 B2 | 8/2008 | Moeny et al. |
| 7,416,258 B2 | 8/2008 | Reed et al. |
| 7,418,171 B2 * | 8/2008 | Grattan et al. .................. 385/37 |
| 7,424,190 B2 | 9/2008 | Dowd et al. |
| 7,471,831 B2 | 12/2008 | Bearman et al. |
| 7,487,834 B2 | 2/2009 | Reed et al. |
| 7,490,664 B2 | 2/2009 | Skinner et al. |
| 7,503,404 B2 | 3/2009 | McDaniel et al. |

(56) References Cited

U.S. PATENT DOCUMENTS

| | | |
|---|---|---|
| 7,515,782 B2 | 4/2009 | Zhang et al. |
| 7,516,802 B2 | 4/2009 | Smith, Jr. |
| 7,518,722 B2 | 4/2009 | Julian et al. |
| 7,527,108 B2 | 5/2009 | Moeny |
| 7,530,406 B2 | 5/2009 | Moeny et al. |
| 7,559,378 B2 | 7/2009 | Moeny |
| 7,587,111 B2 | 9/2009 | de Montmorillon et al. |
| 7,600,564 B2 | 10/2009 | Shampine et al. |
| 7,603,011 B2 | 10/2009 | Varkey et al. |
| 7,617,873 B2 | 11/2009 | Lovell et al. |
| 7,624,743 B2 | 12/2009 | Sarkar et al. |
| 7,628,227 B2 | 12/2009 | Marsh |
| 7,646,953 B2 | 1/2010 | Dowd et al. |
| 7,647,948 B2 | 1/2010 | Quigley et al. |
| 7,656,535 B2 * | 2/2010 | Healey et al. ............. 356/477 |
| 7,671,983 B2 | 3/2010 | Shammai et al. |
| 7,715,664 B1 | 5/2010 | Shou et al. |
| 7,720,323 B2 | 5/2010 | Yamate et al. |
| 7,769,260 B2 | 8/2010 | Hansen et al. |
| 7,802,384 B2 | 9/2010 | Kobayashi et al. |
| 7,834,777 B2 | 11/2010 | Gold |
| 7,848,368 B2 | 12/2010 | Gapontsev et al. |
| 7,872,736 B2 * | 1/2011 | Rogers et al. ............. 356/73.1 |
| 7,900,699 B2 | 3/2011 | Ramos et al. |
| 7,938,175 B2 | 5/2011 | Skinner et al. |
| 7,946,341 B2 * | 5/2011 | Hartog et al. ............. 166/254.1 |
| 7,961,331 B2 * | 6/2011 | Healey ......................... 356/477 |
| 8,003,932 B2 * | 8/2011 | Sikora et al. ............. 250/227.14 |
| 8,011,454 B2 | 9/2011 | Castillo |
| 8,074,332 B2 | 12/2011 | Keatch et al. |
| 8,082,996 B2 | 12/2011 | Kocis et al. |
| 8,091,638 B2 | 1/2012 | Dusterhoft et al. |
| 8,109,345 B2 | 2/2012 | Jeffryes |
| 8,116,625 B2 * | 2/2012 | Ito et al. ..................... 398/30 |
| 8,175,433 B2 | 5/2012 | Caldwell et al. |
| 8,225,867 B2 * | 7/2012 | Hartog et al. ............. 166/250.01 |
| 8,347,958 B2 * | 1/2013 | Hartog et al. ............. 166/250.01 |
| 8,517,096 B2 * | 8/2013 | Vigneaux et al. ......... 166/253.1 |
| 8,576,480 B2 * | 11/2013 | Yoshida .................. 359/341.43 |
| 8,670,662 B2 * | 3/2014 | Healey et al. .............. 398/20 |
| 2002/0007945 A1 | 1/2002 | Neuroth et al. |
| 2002/0039465 A1 | 4/2002 | Skinner |
| 2002/0189806 A1 | 12/2002 | Davidson et al. |
| 2003/0000741 A1 | 1/2003 | Rosa |
| 2003/0039457 A1 * | 2/2003 | Holmquist ................. 385/107 |
| 2003/0052256 A1 * | 3/2003 | Spirin et al. ............. 250/227.11 |
| 2003/0053738 A1 * | 3/2003 | Kato et al. ................. 385/15 |
| 2003/0053783 A1 | 3/2003 | Shirasaki |
| 2003/0056990 A1 | 3/2003 | Oglesby |
| 2003/0085040 A1 | 5/2003 | Hemphill et al. |
| 2003/0094281 A1 | 5/2003 | Tubel |
| 2003/0132029 A1 | 7/2003 | Parker |
| 2003/0145991 A1 | 8/2003 | Olsen |
| 2003/0159283 A1 | 8/2003 | White |
| 2003/0160164 A1 | 8/2003 | Jones et al. |
| 2003/0169956 A1 * | 9/2003 | Lange et al. ................ 385/12 |
| 2003/0226826 A1 | 12/2003 | Kobayashi et al. |
| 2004/0006429 A1 | 1/2004 | Brown |
| 2004/0016295 A1 | 1/2004 | Skinner et al. |
| 2004/0020643 A1 | 2/2004 | Thomeer et al. |
| 2004/0026382 A1 | 2/2004 | Richerzhagen |
| 2004/0033017 A1 | 2/2004 | Kringlebotn et al. |
| 2004/0074979 A1 | 4/2004 | McGuire |
| 2004/0093950 A1 | 5/2004 | Bohnert |
| 2004/0112642 A1 | 6/2004 | Krueger et al. |
| 2004/0119471 A1 | 6/2004 | Blanz et al. |
| 2004/0129418 A1 | 7/2004 | Jee et al. |
| 2004/0195003 A1 | 10/2004 | Batarseh |
| 2004/0206505 A1 | 10/2004 | Batarseh |
| 2004/0207731 A1 | 10/2004 | Bearman et al. |
| 2004/0211894 A1 | 10/2004 | Hother et al. |
| 2004/0218176 A1 | 11/2004 | Shammai et al. |
| 2004/0244970 A1 | 12/2004 | Smith, Jr. |
| 2004/0252748 A1 | 12/2004 | Gleitman |
| 2004/0256103 A1 | 12/2004 | Batarseh |
| 2005/0007583 A1 | 1/2005 | DiFoggio |
| 2005/0012244 A1 | 1/2005 | Jones |
| 2005/0034857 A1 | 2/2005 | Defretin et al. |
| 2005/0094129 A1 | 5/2005 | MacDougall |
| 2005/0099618 A1 | 5/2005 | DiFoggio et al. |
| 2005/0115741 A1 | 6/2005 | Terry et al. |
| 2005/0121235 A1 | 6/2005 | Larsen et al. |
| 2005/0155663 A1 * | 7/2005 | Dhellemmes et al. ......... 138/149 |
| 2005/0169644 A1 * | 8/2005 | Ueno et al. ................. 398/201 |
| 2005/0189146 A1 | 9/2005 | Oglesby |
| 2005/0201652 A1 | 9/2005 | Ellwood, Jr. |
| 2005/0230107 A1 | 10/2005 | McDaniel et al. |
| 2005/0252286 A1 | 11/2005 | Ibrahim et al. |
| 2005/0263281 A1 * | 12/2005 | Lovell et al. ............. 166/255.1 |
| 2005/0268704 A1 | 12/2005 | Bissonnette et al. |
| 2005/0269132 A1 * | 12/2005 | Batarseh et al. ................. 175/40 |
| 2005/0272512 A1 | 12/2005 | Bissonnette et al. |
| 2005/0272513 A1 | 12/2005 | Bissonnette et al. |
| 2005/0272514 A1 | 12/2005 | Bissonnette et al. |
| 2005/0282645 A1 | 12/2005 | Bissonnette et al. |
| 2006/0038997 A1 | 2/2006 | Julian et al. |
| 2006/0049345 A1 | 3/2006 | Rao et al. |
| 2006/0065815 A1 | 3/2006 | Jurca |
| 2006/0070770 A1 | 4/2006 | Marsh |
| 2006/0102343 A1 | 5/2006 | Skinner et al. |
| 2006/0118303 A1 | 6/2006 | Schultz et al. |
| 2006/0137875 A1 | 6/2006 | Dusterhoft et al. |
| 2006/0165343 A1 * | 7/2006 | Seifert ......................... 385/12 |
| 2006/0185843 A1 | 8/2006 | Smith, Jr. |
| 2006/0191684 A1 | 8/2006 | Smith, Jr. |
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0257150 A1 * | 11/2006 | Tsuchiya et al. ................. 398/79 |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0034409 A1 | 2/2007 | Dale et al. |
| 2007/0036499 A1 * | 2/2007 | Shukunami et al. .......... 385/128 |
| 2007/0081157 A1 | 4/2007 | Csutak et al. |
| 2007/0125163 A1 | 6/2007 | Dria et al. |
| 2007/0193990 A1 | 8/2007 | Richerzhagen et al. |
| 2007/0217736 A1 | 9/2007 | Zhang et al. |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1 | 12/2007 | de Montmorillon et al. |
| 2008/0013574 A1 * | 1/2008 | Furuya et al. ..................... 372/6 |
| 2008/0023202 A1 | 1/2008 | Keatch et al. |
| 2008/0053702 A1 | 3/2008 | Smith, Jr. |
| 2008/0073077 A1 | 3/2008 | Tunc et al. |
| 2008/0087078 A1 * | 4/2008 | Vannuffelen .......... E21B 47/102 73/152.54 |
| 2008/0093125 A1 | 4/2008 | Potter et al. |
| 2008/0112760 A1 | 5/2008 | Curlett |
| 2008/0128123 A1 | 6/2008 | Gold |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0239295 A1 * | 10/2008 | Xia et al. ..................... 356/73.1 |
| 2008/0245568 A1 | 10/2008 | Jeffryes |
| 2008/0273852 A1 | 11/2008 | Parker et al. |
| 2009/0020333 A1 | 1/2009 | Marsh |
| 2009/0031870 A1 | 2/2009 | O'Connor |
| 2009/0033176 A1 | 2/2009 | Huang et al. |
| 2009/0033919 A1 * | 2/2009 | He et al. ..................... 356/73.1 |
| 2009/0049345 A1 | 2/2009 | Mock et al. |
| 2009/0050371 A1 | 2/2009 | Moeny |
| 2009/0078467 A1 | 3/2009 | Castillo |
| 2009/0084546 A1 * | 4/2009 | Ekseth et al. ............. 166/255.1 |
| 2009/0105955 A1 | 4/2009 | Castillo et al. |
| 2009/0114386 A1 * | 5/2009 | Hartog et al. ............. 166/250.08 |
| 2009/0126235 A1 | 5/2009 | Kobayashi et al. |
| 2009/0133871 A1 | 5/2009 | Skinner et al. |

(56) References Cited

U.S. PATENT DOCUMENTS

| | | |
|---|---|---|
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0248344 A1* | 10/2009 | Hirabayashi et al. ........... 702/85 |
| 2009/0260834 A1 | 10/2009 | Henson et al. |
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | de Montmorillon et al. |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler |
| 2010/0044103 A1 | 2/2010 | Moxley |
| 2010/0044104 A1 | 2/2010 | Zediker |
| 2010/0044105 A1 | 2/2010 | Faircloth |
| 2010/0044106 A1 | 2/2010 | Zediker |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0155059 A1 | 6/2010 | Ullah |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0197119 A1 | 8/2010 | Lai et al. |
| 2010/0215326 A1 | 8/2010 | Zediker |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0252324 A1* | 10/2010 | Woskov et al. ................. 175/11 |
| 2010/0303427 A1* | 12/2010 | Rambow ............... E21B 47/011 385/95 |
| 2010/0326659 A1 | 12/2010 | Schultz et al. |
| 2010/0326665 A1 | 12/2010 | Redlinger et al. |
| 2011/0000677 A1* | 1/2011 | Overfield ...................... 166/336 |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0259591 A1* | 10/2011 | Vinegar ....................... 166/302 |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | DeWitt |
| 2012/0068086 A1 | 3/2012 | DeWitt |
| 2012/0068523 A1 | 3/2012 | Bowles |
| 2012/0074110 A1 | 3/2012 | Zediker |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0217015 A1 | 8/2012 | Zediker |
| 2012/0217017 A1 | 8/2012 | Zediker |
| 2012/0217018 A1 | 8/2012 | Zediker |
| 2012/0217019 A1 | 8/2012 | Zediker |
| 2012/0248078 A1 | 10/2012 | Zediker |
| 2012/0255774 A1 | 10/2012 | Grubb |
| 2012/0255933 A1 | 10/2012 | McKay |
| 2012/0261188 A1 | 10/2012 | Zediker |
| 2012/0266803 A1 | 10/2012 | Zediker |
| 2012/0267168 A1 | 10/2012 | Grubb |
| 2012/0273269 A1 | 11/2012 | Rinzler et al. |
| 2012/0273470 A1 | 11/2012 | Zediker |
| 2012/0275159 A1 | 11/2012 | Fraze |
| 2012/0288284 A1* | 11/2012 | Yoshida et al. ............... 398/186 |
| 2012/0314278 A1* | 12/2012 | Yoshida ...................... 359/341.1 |
| 2013/0011102 A1 | 1/2013 | Rinzler |
| 2013/0043029 A1* | 2/2013 | Vinegar et al. ............... 166/302 |
| 2013/0175090 A1* | 7/2013 | Zediker et al. .................. 175/16 |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1 | 9/2013 | Linyaev |
| 2013/0228557 A1 | 9/2013 | Zediker |
| 2013/0266031 A1 | 10/2013 | Norton |
| 2013/0319984 A1 | 12/2013 | Linyaev |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch |
| 2014/0190949 A1 | 7/2014 | Zediker |
| 2014/0231085 A1 | 8/2014 | Zediker |
| 2014/0231398 A1 | 8/2014 | Land |
| 2014/0248025 A1 | 9/2014 | Rinzler |
| 2014/0345872 A1 | 11/2014 | Zediker |

FOREIGN PATENT DOCUMENTS

| | | |
|---|---|---|
| EP | 0 565 287 A1 | 10/1993 |
| EP | 0 950 170 B1 | 9/2002 |
| FR | 2 716 924 A1 | 9/1995 |
| GB | 1 284 454 | 8/1972 |
| GB | 2420358 B | 5/2006 |
| JP | 09072738 A | 3/1997 |
| JP | 09-242453 A | 9/1997 |
| JP | 2000-334590 A | 12/2000 |
| JP | 2004-108132 A | 4/2004 |
| JP | 2006-307481 A | 11/2006 |
| JP | 2007-120048 A | 5/2007 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 | 1/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |

(56) References Cited

FOREIGN PATENT DOCUMENTS

| WO | WO 2008/016852 A1 | 2/2008 |
|---|---|---|
| WO | WO 2008/070509 A2 | 6/2008 |
| WO | WO 2008/085675 A1 | 7/2008 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2012, Zediker et al.
U.S. Appl. No. 13/403,132, filed Feb. 23, 2012, Zediker et al.
U.S. Appl. No. 13/403,287, filed Feb. 23, 2012, Grubb et al.
U.S. Appl. No. 13/403,615, filed Feb. 23, 2012, Grubb et al.
U.S. Appl. No. 13/366,882, filed Feb. 6, 2012, McKay et al.
U.S. Appl. No. 13/403,692, filed Feb. 23, 2012, Zediker et al.
U.S. Appl. No. 13/403,509, filed Feb. 23, 2012, Fraze et al.
U.S. Appl. No. 13/403,741, filed Feb. 23, 2012, Zediker et al.
U.S. Appl. No. 13/486,795, filed Feb. 23, 2012, Rinzler et al.
U.S. Appl. No. 13/565,345, filed Feb. 23, 2012, Zediker et al.
U.S. Appl. No. 13/768,149, filed Feb. 15, 2013, Zediker et al.
U.S. Appl. No. 13/777,650, filed Feb. 26, 2013, Zediker et al.
U.S. Appl. No. 13/782,869, filed Mar. 1, 2013, Schroit et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
International Search Report and Written Opinion for PCT App. No. PCT/US10/24368, dated Nov. 2, 2010, 16 pgs.
International Search Report for PCT Application No. PCT/US09/54295, dated Apr. 26, 2010, 16 pgs.
International Search Report for PCT Application No. PCT/US2011/044548, dated Jan. 24, 2012, 17 pgs.
International Search Report for PCT Application No. PCT/US2011/047902, dated Jan. 17, 2012, 9 pgs.
International Search Report for PCT Application No. PCT/US2011/050044 dated Feb. 1, 2012, 26 pgs.
International Search Report for PCT Application No. PCT/US2012/026277, dated May 30, 2012, 11 pgs.
International Search Report for PCT Application No. PCT/US2012/026265, dated May 30, 2012, 14 pgs.
International Search Report for PCT Application No. PCT/US2012/026280, dated May 30, 2012, 12 pgs.
International Search Report for PCT Application No. PCT/US2012/026337, dated Jun. 7, 2012, 21 pgs.
International Search Report for PCT Application No. PCT/US2012/026471, dated May 30, 2012, 13 pgs.
International Search Report for PCT Application No. PCT/US2012/026525, dated May 31, 2012, 8 pgs.
International Search Report for PCT Application No. PCT/US2012/026526, dated May 31, 2012, 10 pgs.
International Search Report for PCT Application No. PCT/US2012/026494, dated May 31, 2012, 12 pgs.
International Search Report for PCT Application No. PCT/US2012/020789, dated Jun. 29, 2012, 9 pgs.
International Search Report for PCT Application No. PCT/US2012/040490, dated Oct. 22, 2012, 14 pgs.
International Search Report for PCT Application No. PCT/US2012/049338, dated Jan. 22, 2013, 14 pgs.
Abdulagatova, Z. et al., "Effect of Temperature and Pressure on the Thermal Conductivity of Sandstone", *International Journal of Rock Mechanics & Mining Sciences*, vol. 46, 2009, pp. 1055-1071.
Abousleiman, Y. et al., "Poroelastic Solution of an Inclined Borehole in a Transversely Isotropic Medium", *Rock Mechanics*, Daemen & Schultz (eds), 1995, pp. 313-318.
Ackay, H. et al., Paper titled "Orthonormal Basis Functions for Continuous-Time Systems and Lp Convergence", date unknown but prior to Aug. 19, 2009, pp. 1-12.
Acosta, A. et al., paper from X Brazilian MRS meeting titled "Drilling Granite With Laser Light", X Encontro da SBPMat Granado-RS, Sep. 2011, 4 pages including pp. 56 and 59.
Agrawal Dinesh et al., "Microstructural by TEM of WC/Co composites Prepared by Conventional and Microwave Processes", Materials Research Lab, The Pennsylvania State University, *15th International Plansee Seminar*, vol. 2, , 2001, pp. 677-684.
Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, The Pennsylvania State University, 2003, 10 pgs.
Agrawal Dinesh et al., Report on "Graded Steele-Tungsten Cardide/Cobalt-Diamond Systems Using Microwave Heating", Material Research Institute, Penn State University, *Proceedings of the 2002 International Conference on Functionally Graded Materials*, 2002, pp. 50-58.
Agrawal, Govind P., "Nonlinear Fiber Optics", Chap. 9, Fourth Edition, Academic Press copyright 2007, pp. 334-337.
Ahmadi, M. et al., "The Effect of Interaction Time and Saturation of Rock on Specific Energy in ND:YAG Laser Perforating", *Optics and Laser Technology*, vol. 43, 2011, pp. 226-231.
Ai, H.A. et al., "Simulation of dynamic response of granite: A numerical approach of shock-induced damage beneath impact craters", *International Journal of Impact Engineering*, vol. 33, 2006, pp. 1-10.
Akhatov, I. et al., "Collapse and Rebound of a Laser-Induced Cavitation Bubble", *Physics of Fluids*, vol. 13, No. 10, Oct. 2001, pp. 2805-2819.
Albertson, M. L. et al., "Diffusion of Submerged Jets", a paper for the *American Society of Civil Engineers*, Nov. 5, 1852, pp. 1571-1596.
Al-Harthi, A. A. et al., "The Porosity and Engineering Properties of Vesicular Basalt in Saudi Arabia", *Engineering Geology*, vol. 54, 1999, pp. 313-320.
Anand, U. et al., "Prevention of Nozzle Wear in Abrasive Water Suspension Jets (AWSJ) Using PoroLubricated Nozzles", *Transactions of the ASME*, vol. 125, Jan. 2003, pp. 168-181.
Andersson, J. C. et al., "The Aspo Pillar Stability Experiment: Part II—Rock Mass Response to Coupled Excavation-Induced and Thermal-Induced Stresses", *International Journal of Rock Mechanics & Mining Sciences*, vol. 46, 2009, pp. 879-895.
Anovitz, L. M. et al., "A New Approach to Quantification of Metamorphism Using Ultra-Small and Small Angle Neutron Scattering", *Geochimica et Cosmochimica Acta*, vol. 73, 2009, pp. 7303-7324.
Anton, Richard J. et al., "Dynamic Vickers indentation of brittle materials", *Wear*, vol. 239, 2000, pp. 27-35.

(56) References Cited

OTHER PUBLICATIONS

Antonucci, V. et al., "Numerical and Experimental Study of a Concentrated Indentation Force on Polymer Matrix Composites", an excerpt from the *Proceedings of the COMSOL Conference*, 2009, 4 pages.
Aptukov, V. N., "Two Stages of Spallation", publisher unknown, while the date of the publication is unknown, it is believed to be prior to Aug. 19, 2009, 6 pages.
Ashby, M. F. et al., "The Failure of Brittle Solids Containing Small Cracks Under Compressive Stress States", *Acta Metall.*, vol. 34, No. 3, 1986, pp. 497-510.
ASTM International, "Standard Test Method for Thermal Conductivity of Solids by Means of the Guarded-Comparative-Longitudinal Heat Flow Technique", Standard under the fixed Designation E1225-09, 2009, pp. 1-9.
Atkinson, B. K., "Introduction to Fracture Mechanics and Its Geophysical Applications", *Fracture Mechanics of Rock*, 1987, pp. 1-26.
Aubertin, M. et al., "A Multiaxial Stress Criterion for Short-and Long-Term Strength of Isotropic Rock Media", *International Journal of Rock Mechanics & Mining Sciences*, vol. 37, 2000, pp. 1169-1193.
Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.
Avar, B. B. et al., "Porosity Dependence of the Elastic Modulof Lithophysae-rich Tuff: Numerical and Experimental Investigations", *International Journal of Rock Mechanics & Mining Sciences*, vol. 40, 2003, pp. 919-928.
Aydin, A. et al., "The Schmidt hammer in rock material characterization", *Engineering Geology*, vol. 81, 2005, pp. 1-14.
Backers, T. et al., "Tensile Fracture Propagation and Acoustic Emission Activity in Sandstone: The Effect of Loading Rate", *International Journal of Rock Mechanics & Mining Sciences*, vol. 42, 2005, pp. 1094-1101.
Baek, S. Y. et al., "Simulation of the Coupled Thermal/Optical Effects for Liquid Immersion Micro-/Nanolithography", source unknown, believed to be publically available prior to 2012, 13 pages.
Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.
Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.
Bailo, El Tahir et al., "Spectral signatures and optic coefficients of surface and reservoir shales and limestones at COIL, $CO_2$ and Nd:YAG laser wavelengths", *Petroleum Engineering Department, Colorado School of Mines*, 2004, 13 pgs.
Baird, J. A. "GEODYN: A Geological Formation/Drillstring Dynamics Computer Program", *Society of Petroleum Engineers of AIME*, 1964, 9 pgs.
Baird, J. A. et al., "Analyzing the Dynamic Behavior of Downhole Equipment During Drilling", government Sandia Report, SAND-84-0758C, DE84 008840, 7 pages.
Baird, Jerold et al., Phase 1 Theoretical Description, A Geological Formation Drill String Dynamic Interaction Finite Element Program (GEODYN), *Sandia National Laboratories*, Report No. Sand-84-7101, 1984, 196 pgs.
Batarseh, S. I. et al, "Innovation in Wellbore Perforation Using High-Power Laser", *International Petroleum Technology Conference*, IPTC N0. 10981, Nov. 2005, 7 pages.
Batarseh, S. et al. "Well Perforation Using High-Power Lasers", *Society of Petroleum Engineers*, SPE 84418, 2003, pp. 1-10.
Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.

Baykasoglu, A. et al., "Prediction of Compressive and Tensile Strength of Limestone via Genetic Programming", *Expert Systems with Applications*, vol. 35, 2008, pp. 111-123.
BDM Corporation, Geothermal Completion Technology Life-Cycle Cost Model (GEOCOM), *Sandia National Laboratories*, for the U.S. Dept. of Energy, vols. 1 and 2, 1982, 222 pgs.
Bechtel SAIC Company LLC, "Heat Capacity Analysis", a report prepared for Department of Energy, Nov. 2004, 100 pages.
Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.
Belyaev, V. V., "Spall Damage Modelling and Dynamic Fracture Specificities of Ceramics", *Journal of Materials Processing Technology*, vol. 32, 1992, pp. 135-144.
Benavente, D. et al., "The Combined Influence of Mineralogical, Hygric and Thermal Properties on the Durability of PoroBuilding Stones", *Eur. J. Mineral*, vol. 20, Aug. 2008, pp. 673-685.
Beste, U. et al., "Micro-scratch evaluation of rock types—a means to comprehend rock drill wear", *Tribology International*, vol. 37, 2004, pp. 203-210.
Bieniawski, Z. T., "Mechanism of Brittle Fracture of Rock: Part I—Theory of the Fracture Process", *Int. J. Rock Mech. Min. Sci.*, vol. 4, 1967, pp. 395-406.
Bilotsky, Y. et al., "Modelling Multilayers Systems with Time-Depended Heaviside and New Transition Functions", excerpt from the Proceedings of the 2006 Nordic COMSOL Conference, 2006, 4 pages.
Birkholzer, J. T. et al., "The Impact of Fracture—Matrix Interaction on Thermal-Hydrological Conditions in Heated Fractured Rock", an origial research paper published online http://vzy.scijournals.org/cgi/content/full/5/2/657, May 26, 2006, 27 pages.
Blackwell, B. F., "Temperature Profile in Semi-infinite Body With Exponential Source and Convective Boundary Condition", *Journal of Heat Transfer, Transactions of the ASME*, vol. 112, 1990, pp. 567-571.
Blackwell, D. D. et al., "Geothermal Resources in Sedimentary Basins", a presentation for the Geothermal Energy Generation in Oil and Gas Settings, Mar. 13, 2006, 28 pages.
Blair, S. C. et al., "Analysis of Compressive Fracture in Rock Using Statistical Techniques: Part I. A Non-linear Rule-based Model", *Int. J. Rock Mech. Min. Sci.*, vol. 35 No. 7, 1998, pp. 837-848.
Blomqvist, M. et al., "All-in-Quartz Optics for Low Focal Shifts", *SPIE Photonics West Conference in San Francisco*, Jan. 2011, 12 pages.
Boechat, A. A. P. et al., "Bend Loss in Large Core Multimode Optical Fiber Beam Delivery Systems", *Applied Optics.*, vol. 30 No. 3, Jan. 20, 1991, pp. 321-327.
Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.
Britz, Dieter, "Digital Simulation in Electrochemistry", *Lect. Notes Phys.*, vol. 666, 2005, pp. 103-117.
Brown, G., "Development, Testing and Track Record of Fiber-Optic, Wet-Mate, Connectors", *IEEE*, 2003, pp. 83-88.
Browning, J. A. et al., "Recent Advances in Flame Jet Working of Minerals", *7th Symposium on Rock Mechanics*, Pennsylvania State Univ., 1965, pp. 281-313.
Brujan, E. A. et al., "Dynamics of Laser-Induced Cavitation Bubbles Near an Elastic Boundar", *J. Fluid Mech.*, vol. 433, 2001, pp. 251-281.
Burdine, N. T., "Rock Failure Under Dynamic Loading Conditions", Society of Petroleum Engineers Journal, Mar. 1963, pp. 1-8.
Bybee, K., "Modeling Laser-Spallation Rock Drilling", *JPT*, an SPE available at www.spe.org/jpt, Feb. 2006, 2 pages 62-63.
Bybee, Karen, highlight of "Drilling a Hole in Granite Submerged in Water by Use of CO2 Laser", an SPE available at www.spe.org/jpt, *JPT*, Feb. 2010, pp. 48, 50 and 51.
Cai, W. et al., "Strength of Glass from Hertzian Line Contact", *Optomechanics 2011: Innovations and Solutions*, 2011, 5 pages.

(56) References Cited

OTHER PUBLICATIONS

Capetta, I. S. et al., "Fatigue Damage Evaluation on Mechanical Components Under Multiaxial Loadings", European Comsol Conference, University of Ferrara, Oct. 16, 2009, 25 pages.
Cardenas, R., "Protected Polycrystalline Diamond Compact Bits for Hard Rock Drilling", Report No. DOE-99049-1381, *U.S. Department of Energy*, 2000, pp. 1-79.
Carstens, J. P. et al., "Rock Cutting by Laser", a paper of *Society of Petroleum Engineers of AIME*, 1971, 11 pages.
Carstens, Jeffrey et al., "Heat-Assisted Tunnel Boring Machines", *Federal Railroad Administration and Urban Mass Transportation Administration*, U.S. Dept. of Transportation, Report No. FRA-RT-71-63, 1970, 340 pgs.
Caruso, C. et al., "Dynamic Crack Propagation in Fiber Reinforced Composites", Excerpt from the Proceedings of the COMSOL Conference, 2009, 5 pages.
Chastain, T. et al., "Deepwater Drilling Riser System", *SPE Drilling Engineering*, Aug. 1986, pp. 325-328.
Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.
Chen, K., paper titled "Analysis of Oil Film Interferometry Implementation in Non-Ideal Conditions", source unknown, Jan. 7, 2010, pp. 1-18.
Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.
Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.
Cimetiere, A. et al., "A Damage Model for Concrete Beams in Compression", *Mechanics Research Communications*, vol. 34, 2007, pp. 91-96.
Clegg, John et al., "Improved Optimisation of Bit Selection Using Mathematically Modelled Bit-Performance Indices", *IADC/SPE International 102287*, 2006, pp. 1-10.
Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.
Close, F. et al., "Successful Drilling of Basalt in a West of Shetland Deepwater Discovery", *SPE International 96575*, Society of Petroleum Engineers, 2006, pp. 1-10.
Cobern, Martin E., "Downhole Vibration Monitoring & Control System Quarterly Technical Report #1", *APS Technology, Inc.*, Quarterly Technical Report #1, DVMCS, 2003, pp. 1-15.
Cogotsi, G. A. et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.
Cohen, J. H., "High-Power Slim-Hole Drilling System", a paper presented at the conference entitled Natural Gas RD&D Contractor's Review Meeting, Office of Scientific and Technical Information, Apr. 1995, 10 pages.
Cone, C., "Case History of the University Block 9 (Wolfcamp) Field—Gas-Water Injection Secondary Recovery Project", *Journal of Petroleum Technology*, Dec. 1970, pp. 1485-1491.
Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.
Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.
Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.
Coray, P. S. et al., "Measurements on 5:1 Scale Abrasive Water Jet Cutting Head Models", source unknown, available prior to 2012, 15 pages.
Cruden, D. M., "The Static Fatigue of Brittle Rock Under Uniaxial Compression", *Int. J. Rock Mech. Min. Sci. & Geomech. Abstr.*, vol. 11, 1974, pp. 67-73.
da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.
Dahl, F. et al., "Development of a New Direct Test Method for Estimating Cutter Life, Based on the Sievers' J Miniature Drill Test", *Tunnelling and Underground Space Technology*, vol. 22, 2007, pp. 106-116.
Dahl, Filip et al., "Development of a new direct test method for estimating cutter life, based on the Sievers J miniature drill test", *Tunnelling and Underground Space Technology*, vol. 22, 2007, pp. 106-116.
Damzen, M. J. et al., "Stimulated Brillion Scattering", Chapter 8—SBS In Optical Fibres, OP Publishing Ltd, Published by Institute of Physics, London, England, 2003, pp. 137-153.
Das, A. C. et al., "Acousto-ultrasonic study of thermal shock damage in castable refractory", *Journal of Materials Science Letters*, vol. 10, 1991, pp. 173-175.
de Castro Lima, J. J. et al., "Linear Thermal Expansion of Granitic Rocks: Influence of Apparent Porosity, Grain Size and Quartz Content", *Bull Eng Geol Env.*, 2004, vol. 63, pp. 215-220.
De Guire, Mark R., "Thermal Expansion Coefficient (start)", *EMSE 201—Introduction to Materials Science & Engineering*, 2003, pp. 15.1-15.15.
Degallaix, J. et al., "Simulation of Bulk-Absorption Thermal Lensing in Transmissive Optics of Gravitational Waves Detector", *Appl. Phys.*, B77, 2003, pp. 409-414.
Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.
Diamond-Cutter Drill Bits, by Geothermal Energy Program, Office of Geothermal and Wind Technologies, 2000, 2 pgs.
Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.
Dinçer, Ismail et al., "Correlation between Schmidt hardness, uniaxial compressive strength and Young's modulfor andesites, basalts and tuffs", *Bull Eng Geol Env*, vol. 63, 2004, pp. 141-148.
Dole, L. et al., "Cost-Effective CementitioMaterial Compatible with Yucca Mountain Repository Geochemistry", a paper prepared by Oak Ridge National Laboratory for the Department of Energy, No. ORNL/TM-2004/296, Dec. 2004, 128 pages.
Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.
Dunn, James C., "Geothermal Technology Development at Sandia", *Geothermal Research Division, Sandia National Laboratories*, 1987, pp. 1-6.
Dutton, S. P. et al., "Evolution of Porosity and Permeability in the Lower CretaceoTravis Peak Formation, East Texas", *The American Association of Petroleum Geologists Bulletin*, vol. 76, No. 2, Feb. 1992, pp. 252-269.
Dyskin, A. V. et al., "Asymptotic Analysis of Crack Interaction with Free Boundary", *International Journal of Solids and Structure*, vol. 37, 2000, pp. 857-886.
Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.
Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

(56) References Cited

OTHER PUBLICATIONS

Eichler, H.J. et al., "Stimulated Brillouin Scattering in Multimode Fibers for Optical Phase Conjugation", *Optics Communications*, vol. 208, 2002, pp. 427-431.

Eighmy, T. T. et al., "Microfracture Surface Charaterizations: Implications for in Situ Remedial Methods in Fractured Rock", *Bedrock Bioremediation Center, Final Report, National Risk Management Research Laboratory, Office of Research and Development, U.S. Environmental Protection Agency*, EPA/600/R-05/121, 2006, pp. 1-99.

Elsayed, M.A. et al., "Measurement and analysis of Chatter in a Compliant Model of a Drillstring Equipped With a PDC Bit", *Mechanical Engineering Dept., University of Southwestern Louisiana and Sandia National Laboratories*, 2000, pp. 1-10.

Ersoy, A., "Wear Characteristics of PDC Pin and Hybrid Core Bits in Rock Drilling", *Wear*, vol. 188, 1995, pp. 150-165.

Extreme Coil Drilling, by Extreme Drilling Corporation, 2009, 10 pgs.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Ferro, D. et al., "Vickers and Knoop hardness of electron beam deposited ZrC and HfC thin films on titanium", *Surface & Coatings Technology*, vol. 200, 2006, pp. 4701-4707.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Field, F. A., "A Simple Crack-Extension Criterion for Time-Dependent Spallation", *J. Mech. Phys. Solids*, vol. 19, 1971, pp. 61-70.

Figueroa, H. et al., "Rock removal using high power lasers for petroleum exploitation purposes", *Gas Technology Institute, Colorado School of Mines, Halliburton Energy Services, Argonne National Laboratory*, 2002, pp. 1-13.

Finger, J. T. et al., "PDC Bit Research at Sandia National Laboratories", Sandia Report No. SAND89-0079-UC-253, a report prepared for Department of Energy, Jun. 1989, 88 pages.

Finger, John T. et al., "PDC Bit Research at Sandia National Laboratories", Sandia Report, *Geothermal Research Division 6252, Sandia National Laboratories*, SAND89-0079—UC-253, 1989, pp. 1-88.

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C. et al., "Laser Drilling: Drilling with the Power of Light, Phase 1: Feasibility Study", a Topical Report by the *Gas Technology Institute*, for the Government under Cooperative Agreement No. DE-FC26-00NT40917, Sep. 30, 2001, 107 pages.

Gahan, B. C. et al., "Laser Drilling: Determination of Energy Required to Remove Rock", *Society of Petroleum Engineers International*, SPE 71466, 2001, pp. 1-11.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Efficient of Downhole Pressure Conditions on High-Power Laser Perforation", *Society of Petroleum Engineers*, SPE 97093, 2005, pp. 1-7.

Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.

Gale, J. F. W. et al., "Natural Fractures in the Barnett Shale and Their Importance for Hydraulic Fracture Treatments", The American Assoction of Petroleum Geologists, *AAPG Bulletin*, vol. 91, No. 4, Apr. 2007, pp. 603-622.

Gardner, R. D. et al., "Flourescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Glowka, David A. et al., "Program Plan for the Development of Advanced Synthetic-Diamond Drill Bits for Hard-Rock Drilling", *Sandia National Laboratories*, SAND 93-1953, 1993, pp. 1-50.

Glowka, David A. et al., "Progress in the Advanced Synthetic-Diamond Drill Bit Program", *Sandia National Laboratories*, SAND95-2617C, 1994, pp. 1-9.

Glowka, David A., "Design Considerations for a Hard-Rock PDC Drill Bit", *Geothermal Technology Development Division 6241, Sandia National Laboratories*, SAND-85-0666C, DE85 008313, 1985, pp. 1-23.

Glowka, David A., "Development of a Method for Predicting the Performance and Wear of PDC Drill Bits", *Sandia National Laboratories*, SAND86-1745-UC-66c, 1987, pp. 1-206.

Glowka, David A., "The Use of Single-Cutter Data in the Analysis of PDC Bit Designs", *61st Annual Technical Conference and Exhibition of Society of Petroleum Engineers*, 1986, pp. 1-37.

Gonthier, F. "High-power All-Fiber® components: The missing link for high power fiber fasers", source unknown, 11 pages.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Graves, R. M. et al., "Spectral signatures and optic coeffecients of surface and reservoir rocks at COIL, CO2 and Nd:YAG laser wavelenghts", source unknown, 13 pages.

Graves, R. M. et al., "StarWars Laser Technology Applied to Drilling and Completing Gas Wells", *SPE*, No. 49259, a paper prepared for presentation at the 1998 SPE Annual Technical Conference and Exhibition, 1998, pp. 761-770.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Drilling and Completing Oil and Natural Gas Wells", Topical Report, *Petroleum Engineering Department, Colorado School of Mines*, 2001, pp. 1-157.

Green, D. J. et al., "Crack Arrest and Multiple Crackling in Glass Through the Use of Designed Residual Stress Profiles", *Science*, vol. 283, No. 1295, 1999, pp. 1295-1297.

(56) References Cited

OTHER PUBLICATIONS

Grigoryan, V., "InhomogeneoBoundary Value Problems", a lecture for Math 124B, Jan. 26, 2010, pp. 1-5.
Grigoryan, V., "Separathion of variables: Neumann Condition", a lecture for Math 124A, Dec. 1, 2009, pp. 1-3.
Gunn, D. A. et al., "Laboratory Measurement and Correction of Thermal Properties for Application to the Rock Mass", *Geotechnical and Geological Engineering*, vol. 23, 2005, pp. 773-791.
Guo, B. et al., "Chebyshev Rational Spectral and Pseudospectral Methods on a Semi-infinite Interval", *Int. J. Numer. Meth. Engng*, vol. 53, 2002, pp. 65-84.
Gurarie, V. N., "Stress Resistance Parameters of Brittle Solids Under Laser/Plasma Pulse Heating", *Materials Science and Engineering*, vol. A288, 2000, pp. 168-172.
Habib, P. et al., "The Influence of Residual Stresses on Rock Hardness", *Rock Mechanics*, vol. 6, 1974, pp. 15-24.
Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.
Hall, K. et al., "Rock Albedo and Monitoring of Thermal Conditions in Respect of Weathering: Some Expected and Some Unexpected Results", *Earth Surface Processes and Landforms*, vol. 30, 2005, pp. 801-811.
Hall, Kevin, "The role of thermal stress fatigue in the breakdown of rock in cold regions", *Geomorphology*, vol. 31, 1999, pp. 47-63.
Hammer, D. X. et al., "Shielding Properties of Laser-Induced Breakdown in Water for Pulse Durations from 5 ns to 125 fs", *Applied Optics*, vol. 36, No. 22, Aug. 1, 1997, pp. 5630-5640.
Han, Wei, "Computational and experimental investigations of laser drilling and welding for microelectronic packaging", *Dorchester Polytechnic Institute*, A Dissertation submitted in May 2004, 242 pgs.
Hancock, M. J., "The 1-D Heat Equation: 18.303 Linear Partial Differential Equations", source unknown, 2004, pp. 1-41.
Hareland, G. et al., "Drag—Bit Model Including Wear", *SPE*, No. 26957, a paper prepared for presentation at the Latin American/Caribbean Petroleum Engineering Conference, Apr. 1994, pp. 657-667.
Hareland, G. et al., "Cutting Efficiency of a Single PDC Cutter on Hard Rock", *Journal of Canadian Petroleum Technology*, vol. 48, No. 6, 2009, pp. 1-6.
Hareland, G., et al., "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.
Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.
Hashida, T. et al., "Numerical Simulation with Experimental Verification of the Fracture Behavior in Granite Under Confining Pressures based on the Tension-Softening Model", *International Journal of Fracture*, vol. 59, 1993, pp. 227-244.
Hasting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.
Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.
Healy, Thomas E., "Fatigue Crack Growth in Lithium Hydride", *Lawrence Livermore National Laboratory*, 1993, pp. 1-32.
Hettema, M. H. H. et al., "The Influence of Steam Pressure on Thermal Spalling of Sedimentary Rock: Theory and Experiments", *Int. J. Rock Mech. Min. Sci.*, vol. 35, No. 1, 1998, pp. 3-15.
Hibbs, Louis E. et al., "Wear Mechanisms for Polycrystalline-Diamond Compacts as Utilized fro Drilling in Geothermal Environments", *Sandia National Laboratories*, for the United States Government, Report No. SAND-82-7213, 1983, 287 pgs.
Hoek, E., "Fracture of Anisotropic Rock", *Journal of the South African Institute of Mining and Metallurgy*, vol. 64, No. 10, 1964, pp. 501-523.
Hood, M., "Waterjet-Assisted Rock Cutting Systems—The Present State of the Art", *International Journal of Mining Engineering*, vol. 3, 1985, pp. 91-111.
Hoover, Ed R. et al., "Failure Mechanisms of Polycrystalline-Diamond Compact Drill Bits in Geothermal Environments", Sandia Report, *Sandia National Laboratories*, SAND81-1404, 1981, pp. 1-35.
Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.
Howells, G., "Super-Water [R] Jetting Applications from 1974 to 1999", paper presented st the Proceedings of the $10^{th}$ American Waterjet Confeence in Houston, Texas, 1999, 25 pages.
Hu, H. et al., "SimultaneoVelocity and Concentration Measurements of a Turbulent Jet Mixing Flow", *Ann. N. Y. Acad. Sci.*, vol. 972, 2002, pp. 254-259.
Huang, C. et al., "A Dynamic Damage Growth Model for Uniaxial Compressive Response of Rock Aggregates", *Mechanics of Materials*, vol. 34, 2002, pp. 267-277.
Huang, H. et al., "Intrinsic Length Scales in Tool-Rock Interaction", *International Journal of Geomechanics*, Jan./Feb. 2008, pp. 39-44.
Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28, 2004, 4 pages.
Huff, C. F. et al., "Recent Developments in Polycrystalline Diamond-Drill-Bit Design", *Drilling Technology Division-4741, Sandia National Laboratories*, 1980, pp. 1-29.
Hutchinson, J. W., "Mixed Mode Cracking in Layered Materials", *Advances in Applied Mechanics*, vol. 29, 1992, pp. 63-191.
IADC Dull Grading System for Fixed Cutter Bits, by Hughes Christensen, 1996, 14 pgs.
Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.
Jackson, M. K. et al., "Nozzle Design for Coherent Water Jet Production", source unknown, believed to be published prior to 2012, pp. 53-89.
Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.
Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.
Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.
Jimeno, Carlos Lopez et al., Drilling and Blasting of Rocks, a. a. Balkema Publishers, 1995, 30 pgs.
Judzis, A. et al., "Investigation of Smaller Footprint Drilling System; Ultra-High Rotary Speed Diamond Drilling Has Potential for Reduced Energy Requirements", IADC/SPE No. 99020, 33 pages.
Jurewicz, B. R., "Rock Excavation with Laser Assistance", *Int. J. Rock Mech. Min. Sci. & Geomech. Abstr.*, vol. 13, 1976, pp. 207-219.
Kahraman, S. et al., "Dominant rock properties affecting the penetration rate of percussive drills", *International Journal of Rock Mechanics and Mining Sciences*, 2003, vol. 40, pp. 711-723.
Karakas, M., "Semianalytical Productivity Models for Perforated Completions", *SPE*, No. 18247, a paper for SPE (Society of Petroleum Engineers) Production Engineering, Feb. 1991, pp. 73-82.
Karasawa, H. et al., "Development of PDC Bits for Downhole Motors", *Proceedings 17th NZ Geothermal Workshop*, 1995, pp. 145-150.
Kelsey, James R., "Drilling Technology/GDO", *Sandia National Laboratories*, SAND-85-1866c, DE85 017231, 1985, pp. 1-7.

(56) References Cited

OTHER PUBLICATIONS

Kemeny, J. M., "A Model for Non-linear Rock Deformation Under Compression Due to Sub-critical Crack Growth", *Int. J. Rock Mech. Min. Sci. & Geomech. Abstr.*, vol. 28 No. 6, 1991, pp. 459-467.

Kerr, Callin Joe, "PDC Drill Bit Design and Field Application Evolution", *Journal of Petroleum Technology*, 1988, pp. 327-332.

Ketata, C. et al., "Knowledge Selection for Laser Drilling in the Oil and Gas Industry", *Computer Society*, 2005, pp. 1-6.

Khan, Ovais U. et al., "Laser heating of sheet metal and thermal stress development", *Journal of Materials Processing Technology*, vol. 155-156, 2004, pp. 2045-2050.

Khandelwal, M., "Prediction of Thermal Conductivity of Rocks by Soft Computing", *Int. J. Earth Sci. (Geol. Rundsch)*, May 11, 2010, 7 pages.

Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.

Kim, K. R. et al., "$CO_2$ laser-plume interaction in materials processing", *Journal of Applied Physics*, vol. 89, No. 1, 2001, pp. 681-688.

Kiwata, T. et al., "Flow Visualization and Characteristics of a Coaxial Jet with a Tabbed Annular Nozzle", *JSME International Journal Series B*, vol. 49, No. 4, 2006, pp. 906-913.

Klotz, K. et al., "Coatings with intrinsic stress profile: Refined creep analysis of (Ti,Al)N and cracking due to cyclic laser heating", *Thin Solid Films*, vol. 496, 2006, pp. 469-474.

Kobayashi, T. et al., "Drilling a 2-inch in Diameter Hole in Granites Submerged in Water by CO2 Lasers", *SPE*, No. 119914, a paper prepared for presentation at the SPE/IADC Drilling Conference and Exhibition, Mar. 2009, 6 pages.

Kobayashi, Toshio et al., "Drilling a 2-inch in Diameter Hole in Granites Submerged in Water by $CO_2$ Lasers", *SPE International, IADC 119914 Drilling Conference and Exhibition*, 2009, pp. 1-11.

Kobyakov, A. et al., "Design Concept for Optical Fibers with Enhanced SBS Threshold", *Optics Express*, vol. 13, No. 14, Jul. 11, 2005, pp. 5338-5346.

Kolari, K., "Damage Mechanics Model for Brittle Failure of Transversely Isotropic Solids (Finite Element Implementation)", *VTT Publications 628*, 2007, 210 pages.

Kollé, J. J., "A Comparison of Water Jet, Abrasive Jet and Rotary Diamond Drilling in Hard Rock", *Tempress Technologies Inc.*, 1999, pp. 1-8.

Kolle, J. J., "HydroPulse Drilling", a Final Report for Department of Energy under Cooperative Development Agreement No. DE-FC26-FT34367, Apr. 2004, 28 pages.

Kovalev, V. I. et al., "Observation of Hole Burning in Spectrum in SBS in Optical Fibres Under CW Monochromatic Laser Excitation", *IEEE*, Jun. 3, 2010, pp. 56-57.

Koyamada, Y. et al., "Simulating and Designing Brillouin Gain Spectrum in Single-Mode Fibers", *Journal of Lightwave Technology*, vol. 22, No. 2, Feb. 2004, pp. 631-639.

Krajcinovic, D. et al., "A Micromechanical Damage Model for Concrete", *Engineering Fracture Mechanics*, vol. 25, No. 5/6, 1986, pp. 585-596.

Kranz, R. L., "Microcracks in Rocks: A Review", *Tectonophysics*, vol. 100, 1983, pp. 449-480.

Kubacki, Emily et al., "Optics for Fiber Laser Applications", *CVI Laser, LLC*, Technical Reference Document #20050415, 2005, 5 pgs.

Kujawski, Daniel, "A fatigue crack driving force parameter with load ratio effects", *International Journal of Fatigue*, vol. 23, 2001, pp. S239-S246.

Labuz, J. F. et al., "Experiments with Rock: Remarks on Strength and Stability Issues", *International Journal of Rock Mechanics & Mining Science*, vol. 44, 2007, pp. 525-537.

Labuz, J. F. et al., "Size Effects in Fracture of Rock", *Rock Mechanics for Industry*, Amadei, Kranz, Scott & Smeallie (eds), 1999, pp. 1137-1143.

Labuz, J. F. et al., "Microrack-dependent fracture of damaged rock", *International Journal of Fracture*, vol. 51, 1991, pp. 231-240.

Lacy, Lewis L., "Dynamic Rock Mechanics Testing for Optimized Fracture Designs", *Society of Petroleum Engineers International, Annual Technical Conference and Exhibition*, 1997, pp. 23-36.

Lally, Evan M., "A Narrow-Linewidth Laser at 1550 nm Using the Pound-Drever-Hall Stabilization Technique", *Thesis*, submitted to Virginia Polytechnic Institute and State University, Blacksburg, Virginia, 2006, 92 pgs.

Langeveld, C. J., "PDC Bit Dynamics", a paper prepared for presentation at the 1992 IADC/SPE Drilling Conference, Feb. 1992, pp. 227-241.

Lau, John H., "Thermal Fatigue Life Prediction of Flip Chip Solder Joints by Fracture Mechanics Method", *Engineering Fracture Mechanics*, vol. 45, No. 5, 1993, pp. 643-654.

Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.

Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.

Legarth, B. et al., "Hydraulic Fracturing in a Sedimentary Geothermal Reservoir: Results and Implications", *International Journal of Rock Mechanics & Mining Sciences*, vol. 42 , 2005, pp. 1028-1041.

Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.

Leong, K. H. et al., "Lasers and Beam Delivery for Rock Drilling", *Argonne National Laboratory*, ANL/TD/TM03-01, 2003, pp. 1-35.

Leong, K. H., "Modeling Laser Beam-Rock Interaction", a report prepared for Department of Energy (http://www.doe.gov/bridge), 8 pages.

Leung, M. et al., "Theoretical study of heat transfer with moving phase-change interface in thawing of frozen food", *Journal of Physics D: Applied Physics*, vol. 38, 2005, pp. 477-482.

Li, Q. et al., "Experimental Research on Crack Propagation and Failure in Rock-type Materials under Compression", *EJGE*, vol. 13, Bund. D, 2008, p. 1-13.

Li, X. B. et al., "Experimental Investigation in the Breakage of Hard Rock by the PDC Cutters with Combined Action Modes", *Tunnelling and Underground Space Technology*, vol. 16., 2001, pp. 107-114.

Liddle, D. et al., "Cross Sector Decommissioning Workshop", presentation, Mar. 23, 2011, 14 pages.

Lima, R. S. et al., "Elastic ModulMeasurements via Laser-Ultrasonic and Knoop Indentation Techniques in Thermally Sprayed Coatings", *Journal of Thermal Spray Technology*, vol. 14(1), 2005, pp. 52-60.

Lin, Y. T., "The Impact of Bit Performance on Geothermal-Well Cost", *Sandia National Laboratories*, SAND-81-1470C, 1981, pp. 1-6.

Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.

Loland, K. E., "ContinuoDamage Model for Load-Response Estimation of Concrete", *Cement and Concrete Research*, vol. 10, 1980, pp. 395-402.

Lomov, I. N. et al., "Explosion in the Granite Field: Hardening and Softening Behavior in Rocks", *U.S. Department of Energy, Lawrence Livermore National Laboratory*, 2001, pp. 1-7.

Long, S. G. et al., "Thermal fatigue of particle reinforced metal-matrix composite induced by laser heating and mechanical load", *Composites Science and Technology*, vol. 65, 2005, pp. 1391-1400.

Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.

Lubarda, V. A. et al., "Damage Model for Brittle Elastic Solids with Unequal Tensile and Compressive Strengths", *Engineering Fracture Mechanics*, vol. 29, No. 5, 1994, pp. 681-692.

Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.

(56) References Cited

OTHER PUBLICATIONS

Luffel, D. L. et al., "Travis Peak Core Permeability and Porosity Relationships at Reservoir Stress", *SPE Formation Evaluation*, Sep. 1991, pp. 310-318.

Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.

Lund, M. et al., "Specific Ion Binding to Macromolecules: Effect of Hydrophobicity and Ion Pairing", *Langmuir*, 2008 vol. 24, 2008, pp. 3387-3391.

Lyons, K. David et al., "NETL Extreme Drilling Laboratory Studies High Pressure High Temperature Drilling Phenomena", *U.S. Department of Energy, National Energy Technology Laboratory*, 2007, pp. 1-6.

Manrique, E. J. et al., "EOR Field Experiences in Carbonate Reservoirs in the United States", *SPE Reservoir Evaluation & Engineering*, Dec. 2007, pp. 667-686.

Maqsood, A. et al., "Thermophysical Properties of PoroSandstones: Measurement and Comparative Study of Some Representative Thermal Conductivity Models", *International Journal of Thermophysics*, vol. 26, No. 5, Sep. 2005, pp. 1617-1632.

Marcuse, D., "Curvature Loss Formula for Optical Fibers", *J. Opt. Soc. Am.*, vol. 66, No. 3, 1976, pp. 216-220.

Marshall, David B. et al., "Indentation of Brittle Materials", *Microindentation Techniques in Materials Science and Engineering, ASTM STP 889; American Society for Testing and Materials*, 1986, pp. 26-46.

Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.

Martins, A. et al., "Modeling of Bend Losses in Single-Mode Optical Fibers", Institutu de Telecomunicacoes, Portugal, 3 pages.

Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.

Maurer, William C., "Advanced Drilling Techniques", published by Petroleum Publishing Co., copyright 1980, 26 pgs.

Maurer, William C., "Novel Drilling Techniques", published by Pergamon Press, UK, copyright 1968, pp. 1-64.

Mazerov, Katie, "Bigger coil sizes, hybrid rigs, rotary steerable advances push coiled tubing drilling to next level", *Drilling Contractor*, 2008, pp. 54-60.

McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.

McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.

Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.

Meister, S. et al., "Glass Fibers for Stimulated Brillouin Scattering and Phase Conjugation", *Laser and Particle Beams*, vol. 25, 2007, pp. 15-21.

Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.

Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.

Mensa-Wilmot, Graham et al., "Advanced Cutting Structure Improves PDC Bit Performance in Hard and Abrasive Drilling Environments", *Society of Petroleum Engineers International*, 2003, pp. 1-13.

Messaoud, Louafi, "Influence of Fluids on the Essential Parameters of Rotary Percussive Drilling", *Laboratoire d'Environnement (Tébessa)*, vol. 14, 2009, pp. 1-8.

Messica, A. et al., "Theory of Fiber-Optic Evanescent-Wave Spectroscopy and Sensor", *Applied Optics*, vol. 35, No. 13, May 1, 1996, pp. 2274-2284.

Mills, W. R. et al., "Pulsed Neutron Porosity Logging", SPWLA Twenty-Ninth Annual Logging Symposium, Jun. 1988, pp. 1-21.

Mirkovich, V. V., "Experimental Study Relating Thermal Conductivity to Thermal Piercing of Rocks", *Int. J. Rock Mech. Min. Sci.*, vol. 5, 1968, pp. 205-218.

Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.

Moavenzadeh, F. et al., "Thin Disk Technique for Analyzing Fock Fractures Induced by Laser Irradiation", a report prepared for the Department of Transportation under Contract C-85-65, May 1968, 91 pages.

Mocofanescu, A. et al., "SBS threshold for single mode and multimode GRIN fibers in an all fiber configuration", *Optics Express*, vol. 13, No. 6, 2005, pp. 2019-2024.

Montross, C. S. et al., "Laser-Induced Shock Wave Generation and Shock Wave Enhancement in Basalt", *International Journal of Rock Mechanics and Mining Sciences*, 1999, pp. 849-855.

Moradian, Z. A. et al., "Predicting the Uniaxial Compressive Strength and Static Young's Modulof Intact Sedimentary Rocks Using the Ultrasonic Test", *International Journal of Geomechanics*, vol. 9, No. 1, 2009, pp. 14-19.

Morozumi, Y. et al., "Growth and Structures of Surface Disturbances of a Round Liquid Jet in a Coaxial Airflow", *Fluid Dynamics Research*, vol. 34, 2004, pp. 217-231.

Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.

Moshier, S. O., "Microporosity in Micritic Limestones: A Review", *Sedimentary Geology*, vol. 63, 1989, pp. 191-213.

Mostafa, M. S. et al., "Investigation of Thermal Properties of Some Basalt Samples in Egypt", *Journal of Thermal Analysis and Calorimetry*, vol. 75, 2004, pp. 178-188.

Mukhin, I. B. et al., "Experimental Study of Kilowatt-Average-Power Faraday Isolators", OSA/ASSP, 2007, 3 pages.

Multari, R. A. et al., "Effect of Sampling Geometry on Elemental Emissions in Laser-Induced Breakdown Spectroscopy", *Applied Spectroscopy*, vol. 50, No. 12, 1996, pp. 1483-1499.

Munro, R. G., "Effective Medium Theory of the Porosity Dependence of Bulk Moduli", *Communications of American Ceramic Society*, vol. 84, No. 5, 2001, pp. 1190-1192.

Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.

Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.

Muto, Shigeki et al., "Laser cutting for thick concrete by multi-pass technique", *Chinese Optics Letters*, vol. 5 Supplement, 2007, pp. S39-S41.

Myung, I. J., "Tutorial on Maximum Likelihood Estimation", *Journal of Mathematical Psychology*, vol. 47, 2003, pp. 90-100.

Nakano, A. et al., "Visualization for Heat and Mass Transport Phenomena in Supercritical Artificial Air", *Cryogenics*, vol. 45, 2005, pp. 557-565.

Naqavi, I. Z. et al., "Laser heating of multilayer assembly and stress levels: elasto-plastic consideration", *Heat and Mass Transfer*, vol. 40, 2003, pp. 25-32.

(56) References Cited

OTHER PUBLICATIONS

Nara, Y. et al., "Study of Subcritical Crack Growth in Andesite Using the Double Torsion Test", *International Journal of Rock Mechanics & Mining Sciences*, vol. 42, 2005, pp. 521-530.

Nara, Y. et al., "Sub-critical crack growth in anisotropic rock", *International Journal of Rock Mechanics and Mining Sciences*, vol. 43, 2006, pp. 437-453.

Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.

Nicklaus, K. et al., "Optical Isolator for Unpolarized Laser Radiation at Multi-Kilowatt Average Power", *Optical Society of America*, 2005, 3 pages.

Nikles, M. et al., "Brillouin Gain Spectrum Characterization in Single-Mode Optical Fibers", *Journal of Lightwave Technology*, vol. 15, No. 10, Oct. 1997, pp. 1842-1851.

Nilsen, B. et al., "Recent Developments in Site Investigation and Testing for Hard Rock TBM Projects", *1999 RETC Proceedings*, 1999, pp. 715-731.

Nimick, F. B., "Empirical Relationships Between Porosity and the Mechanical Properties of Tuff", *Key Questions in Rock Mechanics*, Cundall et al. (eds), 1988, pp. 741-742.

Nolen-Hoeksema, R., "Fracture Development and Mechnical Stratigraphy of Austin Chalk, Texas: Discussion", a discussion for The American Association of Petroleum Geologists Bulletin, vol. 73, No. 6, Jun. 1989, pp. 792-793.

O'Hare, Jim et al., "Design Index: A Systematic Method of PDC Drill-Bit Selection", *Society of Petroleum Engineers International*, IADC/SPE Drilling Conference, 2000, pp. 1-15.

Oglesby, K. et al., "Advanced Ultra High Speed Motor for Drilling", a project update by Impact Technologies LLC for the Department of Energy, Sep. 12, 2005, 36 pages.

Okon, P. et al., "Laser Welding of Aluminium Alloy 5083", *21st International Congress on Applications of Lasers and Electro-Optics*, 2002, pp. 1-9.

Olsen, F. O., "Fundamental Mechanisms of Cutting Front Formation in Laser Cutting", *SPIE*, vol. 2207, pp. 402-413.

Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.

Ortega, Alfonso et al., "Studies of the Frictional Heating of Polycrystalline Diamond Compact Drag Tools During Rock Cutting", *Sandia National Laboratories*, SAND-80-2677, 1982, pp. 1-151.

Ortiz, Blas et al., Improved Bit Stability Reduces Downhole Harmonics (Vibrations), *International Association of Drilling Contractors/Society of Petroleum Engineers Inc.*, 1996, pp. 379-389.

Ouyang, L. B. et al., "General Single Phase Wellbore Flow Model", a report prepared for the COE/PETC, May 2, 1997, 51 pages.

Palashchenko, Yuri A., "Pure Rolling of Bit Cones Doubles Performance", *I & Gas Journal*, vol. 106, 2008, 8 pgs.

Palchaev, D. K. et al., "Thermal Expansion of Silicon Carbide Materials", *Journal of Engineering Physics and Thermophysics*, vol. 66, No. 6, 1994, 3 pages.

Pardoen, T. et al., "An extended model for void growth and Coalescence", *Journal of the Mechanics and Physics of Solids*, vol. 48, 2000, pp. 2467-2512.

Park, Un-Chul et al., "Thermal Analysis of Laser Drilling Processes", *IEEE Journal of Quantum Electronics*, 1972, vol. QK-8, No. 2, 1972, pp. 112-119.

Parker, R. et al., "Drilling Large Diameter Holes in Rocks Using Multiple Laser Beams (504)", while the date of the publication is unknown, it is believed to be prior to Aug. 19, 2009, 6 pages.

Parker, Richard A. et al., "Laser Drilling Effects of Beam Application Methods on Improving Rock Removal", *Society of Petroleum Engineers*, SPE 84353, 2003, pp. 1-7.

Patricio, M. et al., "Crack Propagation Analysis", while the date of the publication is unknown, it is believed to be prior to Aug. 19, 2009, 24 pages.

Pavlina, E. J. et al., "Correlation of Yield Strength and Tensile Strength with Hardness for Steels", *Journals of Materials Engineering and Performance*, vol. 17, No. 6, 2008, pp. 888-893.

Peebler, R. P. et al., "Formation Evaluation with Logs in the Deep Anadarko Basin", *SPE of AIME*, 1972, 15 pages.

Pepper, D. W. et al., "Benchmarking COMSOL Multiphysics 3.5a—CFD Problems", a presentation, Oct. 10, 2009, 54 pages.

Percussion Drilling Manual, by Smith Tools, 2002, 67 pgs.

Pettitt, R. et al., "Evolution of a Hybrid Roller Cone/PDC Core Bit", a paper prepared for Geothermal Resources Council 1980 Annual Meeting, Sep. 1980, 7 pages.

Phani, K. K. et al., "Pororsity Dependence of Ultrasonic Velocity and Elastic Modulin Sintered Uranium Dioxide—a discussion", *Journal of Materials Science Letters*, vol. 5, 1986, pp. 427-430.

Ping, Cao et al., "Testing study of subcritical crack growth rate and fracture toughness in different rocks", *Transactions of NonferroMetals Society of China*, vol. 16, 2006, pp. 709-714.

Plinninger, Dr. Ralf J. et al., "Wear Prediction in Hardrock Excavation Using the CERCHAR Abrasiveness Index (CAI)", *EUROCK 2004 & 53rd Geomechanics Colloquium. Schubert (ed.)*, VGE, 2004, pp. 1-6.

Plinninger, R. J. et al., "Wear Prediction in Hardrock Excavation Using the CERCHAR Abrasiveness Index (CAI)", EUROCK 2004 & 53rd Geomechanics Colloquium, 2004, 6 pages.

Plinninger, Ralf J. et al., "Predicting Tool Wear in Drill and Blast", *Tunnels & Tunneling International Magazine*, 2002, pp. 1-5.

Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.

Polsky, Yarom et al., "Enhanced Geothermal Systems (EGS) Well Construction Technology Evaluation Report", *Sandia National Laboratories*, Sandia Report, SAND2008-7866, 2008, pp. 1-108.

Pooniwala, S. et al., "Lasers: The Next Bit", a paper prepared for the presentation at the 2006 SPE (Society of Petroleum Engineers) Eastern Regional Meeting, Oct. 2006, pp. 1-10.

Pooniwala, Shahvir, "Lasers: The Next Bit", *Society of Petroleum Engineers*, No. SPE 104223, 2006, 10 pgs.

Porter, J. A. et al., "Cutting Thin Sheet Metal with a Water Jet Guided Laser Using VarioCutting Distances, Feed Speeds and Angles of Incidence", *Int. J. Adv. Manuf. Technol.*, vol. 33, 2007, pp. 961-967.

Potyondy, D. O. et al., "A Bonded-particle model for rock", *International Journal of Rock Mechanics and Mining Sciences*, vol. 41, 2004, pp. 1329-1364.

Potyondy, D. O., "Simulating Stress Corrosion with a Bonded-Particle Model for Rock", *International Journal of Rock Mechanics & Mining Sciences*, vol. 44, 2007, pp. 677-691.

Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.

Powell, M. et al., "Optimization of UHP Waterjet Cutting Head, The Orifice", Flow International, while the date of the publication is unknown, it is believed to be prior to Aug. 19, 2009, 19 pages.

Price, R. H. et al., "Analysis of the Elastic and Strength Properties of Yuccs Mountain tuff, Nevada", 26th Symposium on Rock Mechanics, Jun. 1985, pp. 89-96.

Qixian, Luo et al., "Using compression wave ultrasonic transducers to measure the velocity of surface waves and hence determine dynamic modulof elasticity for concrete", *Construction and Building Materials*, vol. 10, No. 4, 1996, pp. 237-242.

Quinn, R. D. et al., "A Method for Calculating Transient Surface Temperatures and Surface Heating Rates for High-Speed Aircraft", NASA, Dec. 2000, 35 pages.

Radkte, Robert, "New High Strength and faster Drilling TSP Diamond Cutters", Report by *Technology International, Inc.*, DOE Award No. DE-FC26-97FT34368, 2006, 97 pgs.

Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.

(56) References Cited

OTHER PUBLICATIONS

Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.

Rauenzahn, R. M. et al., "Rock Failure Mechanisms of Flame-Jet Thermal Spallation Drilling—Theory and Experimental Testing", *Int. J. Rock Mech. Min. Sci. & Geomech. Abstr.*, vol. 26, No. 5, 1989, pp. 381-399.

Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.

Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 583 pgs.

Ravishankar, M. K., "Some Results on Search Complexity vs Accuracy", DARPA Spoken Systems Technology Workshop, Feb. 1997, 4 pages.

Raymond, David W., "PDC Bit Testing at Sandia Reveals Influence of Chatter in Hard-Rock Drilling", *Geothermal Resources Council Monthly Bulletin*, SAND99-2655J, 1999, 7 pgs.

Ream, S. et al., "Zinc Sulfide Optics for High Power Laser Applications", Paper 1609, while the date of the publication is unknown, it is believed to be prior to Aug. 19, 2009, 7 pages.

Rice, J. R., "On the Stability of Dilatant Hardening for Saturated Rock Masses", *Journal of Geophysical Research*, vol. 80, No. 11, Apr. 10, 1975, pp. 1531-1536.

Richter, D. et al., "Thermal Expansion Behavior of IgneoRocks", *Int. J. Rock Mech. Min. Sci. & Geomech. Abstr.*, vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

Rijken, P. et al., "Predicting Fracture Attributes in the Travis Peak Formation Using Quantitative Mechanical Modeling and Stractural Diagenesis", Gulf Coast Association of Geological Societies Transactions vol. 52, 2002, pp. 837-847.

Rijken, P. et al., "Role of Shale Thickness on Vertical Connectivity of Fractures: Application of Crack-Bridging Theory to the Austin Chalk, Texas", *Tectonophysics*, vol. 337 ,2001, pp. 117-133.

Rosler, M., "Generalized Hermite Polynomials and the Heat Equation for Dunkl Operators", a paper, while the date of the publication is unknown, it is believed to be prior to Aug. 19, 2009, pp. 1-24.

Rossmanith, H. P. et al., "Fracture Mechanics Applications to Drilling and Blasting", *Fatigue & Fracture Engineering Materials & Structures*, vol. 20, No. 11, 1997, pp. 1617-1636.

Rossmanith, H. P. et al., "Wave Propagation, Damage Evolution, and Dynamic Fracture Extension. Part I. Percussion Drilling", *Materials Science*, vol. 32, No. 3, 1996, pp. 350-358.

Rubin, A. M. et al., "Dynamic Tensile-Failure-Induced Velocity Deficits in Rock", *Geophysical Research Letters*, vol. 18, No. 2, Feb. 1991, pp. 219-222.

Sachpazis, C. I, M. Sc., Ph. D., "Correlating Schmidt Hardness With Compressive Strength and Young's ModulOf Carbonate Rocks", *International Association of Engineering Geology*, Bulletin, No. 42, 1990, pp. 75-83.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", *International Journal for Numerical and Analytical Methods in Geomechanics*, vol. 3, 1979, pp. 173-186.

Sano, Osam et al., "Acoustic Emission During Slow Crack Growth", *Department Mining and Mineral Engineering, NII-Electronic Library Service*, 1980, pp. 381-388.

Santarelli, F. J. et al., "Formation Evaluation From Logging on Cuttings", *SPE Reservoir Evaluation & Engineering*, Jun. 1998, pp. 238-244.

Sattler, A. R., "Core Analysis in a Low Permeability Sandstone Reservoir: Results from the Multiwell Experiment", a report by Sandia National Laboratories for the Department of Energy, Apr. 1989, 69 pages.

Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.

Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.

Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Schormair, Nik et al., "The influence of anisotropy on hard rock drilling and cutting", *The Geological Society of London, IAEG*, Paper No. 491, 2006, pp. 1-11.

Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.

Shannon, G. J. et al., "High power laser welding in hyperbaric gas and water environments", *Journal of Laser Applications*, vol. 9, 1997, pp. 129-136.

Shiraki, K. et al., "SBS Threshold of a Fiber with a Brillouin Frequency Shift Distribution", *Journal of Lightwave Technology*, vol. 14, No. 1, Jan. 1996, pp. 50-57.

Shuja, S. Z. et al., "Laser heating of semi-infinite solid with consecutive pulses: Influence of materaial properties on temperature field", *Optics & Laser Technology*, vol. 40, 2008, pp. 472-480.

Simple Drilling Methods, WEDC Loughborough University, United Kingdom, 1995, 4 pgs.

Singh, T. N. et al., "Prediction of Thermal Conductivity of Rock Through Physico-Mechanical Properties", *Building and Environment*, vol. 42, 2007, pp. 146-155.

Sinha, D., "Cantilever Drilling—Ushering a New Genre of Drilling", a paper prepared for presentation at the SPE/IADC Middle East Drilling Technology Conference and Exhibition, Oct. 2003, 6 pages.

Sinor, A. et al., "Drag Bit Wear Model", *SPE Drilling Engineering*, Jun. 1989, pp. 128-136.

Smith, D., "Using Coupling Variables to Solve Compressible Flow, Multiphase Flow and Plasma Processing Problems", COMSOL Users Conference 2006, 38 pages.

Smith, E., "Crack Propagation at a Constant Crack Tip Stress Intensity Factor", *Int. Journal of Fracture*, vol. 16, 1980, pp. R215-R218.

Sneider, RM et al., "Rock Types, Depositional History, and Diangenetic Effects, Ivishak reservoir Prudhoe Bay Field", *SPE Reservoir Engineering*, Feb. 1997, pp. 23-30.

Soeder, D. J. et al., "Pore Geometry in High- and Low-Permeability Sandstones, Travis Peak Formation, East Texas", *SPE Formation Evaluation*, Dec. 1990, pp. 421-430.

Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.

Somerton, W. H. et al., "Thermal Expansion of Fluid Saturated Rocks Under Stress", SPWLA Twenty-Second Annual Logging Symposium, Jun. 1981, pp. 1-8.

Sousa, L. M. O. et al., "Influence of Microfractures and Porosity on the Physico-Mechanical Properties and Weathering of Ornamental Granites", *Engineering Geology*, vol. 77, 2005, pp. 153-168.

(56) References Cited

OTHER PUBLICATIONS

Sousa, Luis M. O. et al., "Influence of microfractures and porosity on the physico-mechanical properties and weathering of ornamental granites", *Engineering Geology*, vol. 77, 2005, pp. 153-168.
Stone, Charles M. et al., "Qualification of a Computer Program for Drill String Dynamics", *Sandia National Laboratories*, SAND-85-0633C, 1985, pp. 1-20.
Stowell, J. F. W., "Characterization of Opening-Mode Fracture Systems in the Austin Chalk", *Gulf Coast Association of Geological Societies Transactions*, vol. L1, 2001, pp. 313-320.
Straka, W. A. et al., "Cavitation Inception in Quiescent and Co-Flow Nozzle Jets", 9th International Conference on Hydrodynamics, Oct. 2010, pp. 813-819.
Suarez, M. C. et al., "COMSOL in a New Tensorial Formulation of Non-Isothermal Poroelasticity", publisher unknown, while the date of the publication is unknown, it is believed to be prior to Aug. 19, 2009, 2 pages.
Summers, D. A., "Water Jet Cutting Related to Jet & Rock Properties", publisher unknown, while the date of the publication is unknown, it is believed to be prior to Aug. 19, 2009, 13 pages.
Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.
Takarli, Mokhfi et al., "Damage in granite under heating/cooling cycles and water freeze-thaw condition", *International Journal of Rock Mechanics and Mining Sciences*, vol. 45, 2008, pp. 1164-1175.
Tanaka, K. et al., "The Generalized Relationship Between the Parameters C and m of Paris' Law for Fatigue Crack Growth", *Scripta Metallurgica*, vol. 15, No. 3, 1981, pp. 259-264.
Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.
Tang, C. A. et al., "Coupled analysis of flow, stress and damage (FSD) in rock failure", *International Journal of Rock Mechanics and Mining Sciences*, vol. 39, 2002, pp. 477-489.
Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock Mechanics for Energy*, Mineral and Infrastracture Development in the Northern Regions, Jun. 2005, 7 pages.
Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.
Terzopoulos, D. et al., "Modeling Inelastic Deformation: Viscoelasticity, Plasticity, Fracture", *SIGGRAPH '88*, Aug. 1988, pp. 269-278.
Thomas, R. P., "Heat Flow Mapping at the Geysers Geothermal Field", published by the California Department of Conservation Division of Oil and Gas, 1986, 56 pages.
Thompson, G. D., "Effects of Formation Compressive Strength on Perforator Performance", a paper presented of the Southern District API Division of Production, Mar. 1962, pp. 191-197.
Thorsteinsson, Hildigunnur et al., "The Impacts of Drilling and Reservoir Technology Advances on EGS Exploitation", *Proceedings, Thirty-Third Workshop on Geothermal Reservoir Engineering, Institute for Sustainable Energy, Environment, and Economy (ISEEE)*, 2008, pp. 1-14.
Tovo, R. et al., "Fatigue Damage Evaluation on Mechanical Components Under Multiaxial Loadings", excerpt from the Proceedings of the COMSOL Conference, 2009, 8 pages.
Tuler, F. R. et al., "A Criterion for the Time Dependence of Dynamic Fracture", *The International Jopurnal of Fracture Mechanics*, vol. 4, No. 4, Dec. 1968, pp. 431-437.
Turner, D. et al., "New DC Motor for Downhole Drilling and Pumping Applications", a paper prepared for presentation at the SPE/ICoTA Coiled Tubing Roundtable, Mar. 2001, pp. 1-7.
Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.
Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.
U.S. Dept of Energy, "Chapter 6—Drilling Technology and Costs", from Report for the Future of Geothermal Energy, 2005, 53 pgs.
U.S. Appl. No. 12/840,978, filed Jul. 21, 2009, 61 pgs.
Udd, E. et al., "Fiber Optic Distributed Sensing Systems for Harsh Aerospace Environments", publisher unknown, while the date of the publication is unknown, it is believed to be prior to Aug. 19, 2009, 12 pages.
Valsangkar, A. J. et al., Stress-Strain Relationship for Empirical Equations of Creep in Rocks, *Engineering Geology*, Mar. 29, 1971, 5 pages.
Varnado, S. G. et al., "The Design and Use of Polycrystalline Diamond Compact Drag Bits in the Geothermal Environment", *Society of Petroleum Engineers of AIME*, SPE 8378, 1979, pp. 1-11.
Wagh, A. S. et al., "Dependence of Ceramic Fracture Properties on Porosity", *Journal of Material Sience*, vol. 28, 1993, pp. 3589-3593.
Wagner, F. et al., "The Laser Microjet Technology—10 Years of Development (M401)", publisher unknown, while the date of the publication is unknown, it is believed to be prior to Aug. 19, 2009, 9 pages.
Waldron, K. et al., "The Microstructures of Perthitic Alkali Feldspars Revealed by Hydroflouric Acid Etching", *Contributions to Mineralogy and Petrology*, vol. 116, 1994, pp. 360-364.
Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.
Wandera, C. et al., "Characterization of the Melt Removal Rate in Laser Cutting of Thick-Section Stainless Steel", *Journal of Laser Applications*, vol. 22, No. 2, May 2010, pp. 62-70.
Wandera, C. et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.
Wandera, C. et al., "Laser Power Requirement for Cutting of Thick-Section Steel and Effects of Processing Parameters on Mild Steel Cut Quality", a paper accepted for publication in the Proceedings IMechE Part B, *Journal of Engineering Manufacture*, vol. 225, 2011, 23 pages.
Wandera, C. et al., "Optimization of Parameters for Fiber Laser Cutting of 10mm Stainless Steel Plate", a paper for publication in the Proceeding IMechE Part B, *Journal of Engineering Manufacture*, vol. 225, 2011, 22 pages.
Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.
Wang, C. H., "Introduction to Fractures Mechanics", published by DSTO Aeronautical and Maritime Research Laboratory, Jul. 1996, 82 pages.
Wang, G. et al., "Particle Modeling Simulation of Thermal Effects on Ore Breakage", *Computational Materials Science*, vol. 43, 2008, pp. 892-901.
Waples, D. W. et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.
Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.
Warren, T. M. et al., "Laboratory Drilling Performance of PDC Bits", *SPE Drilling Engineering*, Jun. 1988, pp. 125-135.
Wen-gui, Cao et al., "Damage constituitive model for strain-softening rock based on normal distribution and its parameter determination", *J. Cent. South Univ. Technol.*, vol. 14, No. 5, 2007, pp. 719-724.

(56) References Cited

OTHER PUBLICATIONS

White, E. J. et al., "Reservoir Rock Characteristics of the Madison Limestone in the Williston Basin", *The Log Analyst*, Sep.-Oct. 1970, pp. 17-25.
White, E. J. et al., "Rock Matrix Properties of the Ratcliffe Interval (Madison Limestone) Flat Lake Field, Montana", *SPE of AIME*, Jun. 1968, 16 pages.
Wiercigroch, M., "Dynamics of ultrasonic percussive drilling of hard rocks", *Journal of Sound and Vibration*, vol. 280, 2005, pp. 739-757.
Wilkinson, M. A. et al., "Experimental Measurement of Surface Temperatures During Flame-Jet Induced Thermal Spallation", *Rock Mechanics and Rock Engineering*, 1993, pp. 29-62.
Williams, R. E. et al., "Experiments in Thermal Spallation of VarioRocks", *Transactions of the ASME*, vol. 118, 1996, pp. 2-8.
Willis, David A. et al., "Heat transfer and phase change during picosecond laser ablation of nickel", *International Journal of Heat and Mass Transfer*, vol. 45, 2002, pp. 3911-3918.
Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.
Wippich, M. et al., "Tunable Lasers and Fiber-Bragg-Grating Sensors", Obatined from the at: from the Internet website of The Industrial Physicist at: http://www.aip.org/tip/INPHFA/vol-9/iss-3/p24.html, on May 18, 2010, pp. 1-5.
Wong, Teng-fong et al., "Microcrack statistics, Weibull distribution and micromechanical modeling of compressive failure in rock", *Mechanics of Materials*, vol. 38, 2006, pp. 664-681.
Wood, Tom, "Dual Purpose COTD™ Rigs Establish New Operational Records", *Treme Coil Drilling Corp., Drilling Technology Without Borders*, 2009, pp. 1-18.
Wu, X. Y. et al., "The Effects of Thermal Softening and Heat Conductin on the Dynamic Growth of Voids", *International Journal of Solids and Structures*, vol. 40, 2003, pp. 4461-4478.
Xia, K. et al., "Effects of microstructures on dynamic compression of Barre granite", *International Journal of Rock Mechanics and Mining Sciences*, vol. 45, 2008. pp. 879-887, available at: www.sciencedirect.com.
Xiao, J. Q. et al., "Inverted S-Shaped Model for Nonlinear Fatigue Damage of Rock", *International Journal of Rock Mechanics & Mining Sciences*, vol. 46, 2009, pp. 643-648.
Xu, Z et al. "Modeling of Laser Spallation Drilling of Rocks fro gas- and Oilwell Drilling", *Society of Petroleum Engineers*, SPE 95746, 2005, pp. 1-6.
Xu, Z. et al., "Application of High Powered Lasers to Perforated Completions", *International Congress on Applications of Laser & Electro-Optics*, Oct. 2003, 6 pages.
Xu, Z. et al., "Laser Rock Drilling by a Super-Pulsed CO2 Laser Beam", a manuscript created for the Department of Energy, while the date of the publication is unknown, it is believed to be prior to Aug. 19, 2009, 9 pages.
Xu, Z. et al., "Laser Spallation of Rocks for Oil Well Drilling", Proceedings of the 23rd International Congress on Applications of Lasers and Electro-Optics, 2004, pp. 1-6.
Xu, Z. et al., "Modeling of Laser Spallation Drilling of Rocks for Gas- and Oilwell Drilling", a paper prepared for the presentation at the 2005 SPE (Society of Petroleum Engineers) Annual Technical Conference and Exhibition, Oct. 2005, 6 pages.
Xu, Z. et al., "Rock Perforation by Pulsed Nd: YAG Laser", Proceedings of the 23rd International Congress on Applications of Lasers and Electro-Optics 2004, 2004, 5 pages.
Xu, Z. et al., "Specific Energy of Pulsed Laser Rock Drilling", *Journal of Laser Applications*, vol. 15, No. 1, Feb. 2003, pp. 25-30.
Xu, Z. et al., "Specific Energy for Laser Removal of Rocks", *Proceedings of the 20th International Congress on Applications of Lasers & Electro-Optics*, 2001, pp. 1-8.
Xu, Z. et al., "Specific energy for pulsed laser rock drilling", *Journal of Laser Applications*, vol. 15, No. 1, 2003, pp. 25-30.

Xu, Zhiyue et al., "Laser Spallation of Rocks for Oil Well Drilling", *Proceedings of the 23rd International Congress on Applications of Lasers and Electro-Optics*, 2004, pp. 1-6.
Yabe, T. et al., "The Constrained Interpolation Profile Method for Multiphase Analysis", *Journal of Computational Physics*, vol. 169, 2001, pp. 556-593.
Yamamoto, K. Y. et al., "Detection of Metals in the Environment Using a Portable Laser-Induced Breakdown Spectroscopy Instrument", *Applied Spectroscopy*, vol. 50, No. 2, 1996, pp. 222-233.
Yamashita, Y. et al., "Underwater Laser Welding by 4kW CW YAG Laser", *Journal of Nuclear Science and Technology*, vol. 38, No. 10, Oct. 2001, pp. 891-895.
Yamshchikov, V. S. et al., "An Evaluation of the Microcrack Density of Rocks by Ultrasonic Velocimetric Method", *Moscow Mining Institute. (Translated from Fiziko-Tekhnicheskie Problemy Razrabotki Poleznykh Iskopaemykh)*, 1985, pp. 363-366.
Yasar, E. et al., "Determination of the Thermal Conductivity from Physico-Mechanical Properties", *Bull Eng. Geol. Environ.*, vol. 67, 2008, pp. 219-225.
Yilbas, B. S. et al., "Laser short pulse heating: Influence of pulse intensity on temperature and stress fields", *Applied Surface Science*, vol. 252, 2006, pp. 8428-8437.
Yilbas, B. S. et al., "Laser treatment of aluminum surface: Analysis of thermal stress field in the irradiated región", *Journal of Materials Processing Technology*, vol. 209, 2009, pp. 77-88.
Yilbas, B. S. et al., "Nano-second laser pulse heating and assisting gas jet considerations", *International Journal of Machine Tools & Manufacture*, vol. 40, 2000, pp. 1023-1038.
Yilbas, B. S. et al., "Repetitive laser pulse heating with a convective boundary condition at the surface", *Journal of Physics D: Applied Physics*, vol. 34, 2001, pp. 222-231.
York, J. L. et al., "The Influence of Flashing and Cavitation on Spray Formation", a progress report for UMRI Project 2815 with Delavan Manufacturing Company, Oct. 1959, 27 pages.
Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.
Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.
Zehnder, A. T., "Lecture Notes on Fracture Mechanics", 2007, 227 pages.
Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): *Rock Mechanics Across Borders and Disciplines*, Jun. 2004, 9 pages.
Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.
Zeuch, D.H. et al., "Rock Breakage Mechanism Wirt a PDC Cutter", *Society of Petroleum Engineers, 60th Annual Technical Conference*, Las Vegas, Sep. 22-25, 1985, 11 pgs.
Zhai, Yue et al., "Dynamic failure analysis on granite under uniaxial impact compressive load", *Front. Archit. Civ. Eng. China*, vol. 2, No. 3, 2008, pp. 253-260.
Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.
Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.
Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254-257.
Zhou, X.P., "Microcrack Interaction Brittle Rock Subjected to Uniaxial Tensile Loads", *Theoretical and Applied Fracture Mechanics*, vol. 47, 2007, pp. 68-76.
Zhou, Zehua et al., "A New Thermal-Shock-Resistance Model for Ceramics: Establishment and validation", *Materials Science and Engineering*, A 405, 2005, pp. 272-276.

(56) References Cited

OTHER PUBLICATIONS

Zhu, Dongming et al., "Influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3676, 1997, pp. 1-50.

Zhu, Dongming et al., "Investigation of thermal fatigue behavior of thermal barrier coating systems", *Surface and Coatings Technology*, vol. 94-95, 1997, pp. 94-101.

Zhu, Dongming et al., "Investigation of Thermal High Cycle and Low Cycle Fatigue Mechanisms of Thick Thermal Barrier Coatings", *National Aeronautics and Space Administration, Lewis Research Center*, NASA/TM-1998-206633, 1998, pp. 1-31.

Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.

Zhu, X. et al., "High-Power ZBLAN Glass Fiber Lasers: Review and Prospect", *Advances in OptoElectronics*, vol. 2010, pp. 1-23.

Zietz, J. et al., "Determinants of House Prices: A Quantile Regression Approach", *Department of Economics and Finance Working Paper Series*, May 2007, 27 pages.

Zuckerman, N. et al., "Jet Impingement Heat Transfer: Physics, Correlations, and Numerical Modeling", *Advances in Heat Transfer*, vol. 39, 2006, pp. 565-631.

A Built-for-Purpose Coiled Tubing Rig, by Schulumberger Wells, No. DE-PS26-03NT15474, 2006, 1 pg.

"Chapter I—Laser-Assisted Rock-Cutting Tests", publisher unknown, while the date of the publication is unknown, it is believed to be prior to Aug. 19, 2009, 64 pages.

"Chapter 7: Energy Conversion Systems—Options and Issues", publisher unknown, while the date of the publication is unknown, it is believed to be prior to Aug. 19, 2009, pp. 7-1 to 7-32 and table of contents page.

"Cross Process Innovations", Obtained from the Internet at: http://www.mrl.columbia.edu/ntm/CrossProcess/CrossProcessSect5.htm, on Feb. 2, 2010, 11 pages.

"Fourier Series, Generalized Functions, Laplace Transform", publisher unknown, while the date of the publication is unknown, it is believed to be prior to Aug. 19, 2009, 6 pages.

"Introduction to Optical Liquids", published by Cargille-Sacher Laboratories Inc., Obtained from the Internet at: http://www.cargille.com/opticalintro.shtml, on Dec. 23, 2008, 5 pages.

"Laser Drilling", Oil & Natural Gas Projects (Exploration & Production Technologies) Technical Paper, Dept. of Energy, Jul. 2007, 3 pages.

"Leaders in Industry Luncheon", IPAA & TIPRO, Jul. 8, 2009, 19 pages.

"Measurement and Control of Abrasive Water-Jet Velocity", publisher unknown, while the date of the publication is unknown, it is believed to be prior to Aug. 19, 2009, 8 pages.

"NonhomogeneoPDE—Heat Equation with a Forcing Term", a lecture, 2010, 6 pages.

"Performance Indicators for Geothermal Power Plants", prepared by International Geothermal Association for World Energy Council Working Group on Performance of Renewable Energy Plants, author unknown, Mar. 2011, 7 pages.

"Rock Mechanics and Rock Engineering", publisher unknown, while the date of the publication is unknown, it is believed to be prior to Aug. 19, 2009, 69 pages.

"Shock Tube", Cosmol MultiPhysics 3.5a, 2008, 5 pages.

"Silicone Fluids: Stable, Inert Media", Gelest, Inc., while the date of the publication is unknown, it is believed to be prior to Aug. 19, 2009, 27 pages.

"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.

"Underwater Laser Cutting", TWI Ltd, May/Jun. 2011, 2 pages.

Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2013, 73 pages.
Utility U.S. Appl. No. 13/800,933, filed Mar. 13, 2013, 73 pages.
Utility U.S. Appl. No. 13/849,831, filed Mar. 25, 2013, 83 pages.

\* cited by examiner

LONG DISTANCE HIGH POWER OPTICAL LASER FIBER BREAK DETECTION AND CONTINUITY MONITORING SYSTEMS AND METHODS

This application: (i) claims, under 35 U.S.C. §119(e)(1) the benefit of the filing date of Feb. 24, 2011 of provisional application Ser. No. 61/446,047; (ii) claims, under 35 U.S.C. §119(e)(1) the benefit of the filing date of Feb. 24, 2011 of provisional application Ser. No. 61/446,412; (iii) claims, under 35 U.S.C. §119(e)(1) the benefit of the filing date of Feb. 24, 2011 of provisional application Ser. No. 61/446,312; and (iv) is a continuation-in-part of U.S. patent application Ser. No. 12/544,136 (issued as 8,511,401) filed Aug. 19, 2009, which claims under 35 U.S.C. §119(e)(1) the benefit of the filing date of Feb. 17, 2009 of U.S. provisional application Ser. No. 61/153,271, the benefit of the filing date of Oct. 17, 2008 of U.S. provisional application Ser. No. 61/106,472, the benefit of the filing date of Oct. 3, 2008 of U.S. provisional application Ser. No. 61/102,730, and the benefit of the filing date of Aug. 20, 2008 of U.S. provisional application Ser. No. 61/090,384, the entire disclosure of each of which are incorporated herein by reference.

This invention was made with Government support under Award DE-AR0000044 awarded by the Office of ARPA-E U.S. Department of Energy. The Government has certain rights in this invention.

BACKGROUND OF THE INVENTION

Field of the Invention

The present inventions relate to methods and systems for detecting breaks, damage, interruptions, degradations or unacceptable conditions in high power laser optical fibers used in transmitting high power laser energy over great distances.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

SUMMARY

In the use of high power laser tools, and in particular high power laser tools for applications and processes in remote locations, there is a need for methods and systems for detecting and monitoring conditions of the optical fibers and the efficacy of laser energy transmission, breaks, damage or unacceptable conditions in the high power optical fibers, system and tools used in those applications and processes. The present inventions, among other things, solve these and other needs by providing the articles of manufacture, devices and processes taught herein.

There is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path.

Further, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the operational beam path is at least about 5,000 feet long.

Further, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the operational beam path is at least about 5,000 feet long.

Additionally, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the monitoring and detecting means has a leak detector associated with a fusion splice.

Moreover, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the monitoring and detecting means has a plurality of light detecting devices, associated with a monitoring fiber, wherein the monitoring fiber is associated with an ODTR, whereby the light transmitted a light detecting device is analyzed and correlated to a condition along the operation beam path.

Yet additionally, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the monitoring and detecting means has a plurality of light detecting devices distributed along a portion of a length of the operational beam path, associated with a monitoring fiber, wherein the monitoring fiber is associated with a monitoring device, whereby the light transmitted a light detecting device is analyzed and correlated to a condition along the operation beam path.

Still further, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the detected and analyzed light comprises high power laser back reflections.

Furthermore there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the monitoring and detecting means comprises a plurality of light detecting devices and a photodiode.

Moreover, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the monitoring and detecting means has a distributed temperature sensing fiber with sequential bragg gratings for monitoring temperatures along the operational beam path and detecting anomalies in the temperatures.

Yet still further, there is provided a high power laser drilling system for use in association with a drilling rig, drilling platform, drilling derrick, a snubbing platform, or coiled tubing drilling rig for advancing a borehole in hard rock, the system having: a source of high power laser energy, the laser source capable of providing a laser beam having at least 20 kW of power; a laser bottom hole assembly; the laser bottom hole assembly in optical communication with the laser source thereby defining an operational beam path; and, a means for monitoring and detecting adverse conditions in the transmission of the high power laser energy along the operational beam path, in which the monitoring and detecting means has a fiber having gratings sequentially positioned along a length of the fiber, wherein the gratings are configured to collect light and transmit the collected light to a monitoring device, whereby a anomaly is capable of being detected prior to a failure.

Additionally, there is provided a monitoring an detection system for monitoring an operational high power laser beam path associated with a high power laser drilling, workover and completion system, the monitoring and detection system having: a monitoring fiber having a length associated with a high power laser fiber having a length; the monitoring fiber having a plurality of light detection devices position along the length of the monitoring fiber and the high power laser fiber; and, the monitoring fiber in optical association with the a monitoring device; whereby light from the high power optical fiber is transmitted through the monitoring fiber and to the monitoring device, wherein the light is correlated to a condition of the operational high power laser beam path.

Still further, there is provided a system for providing high power laser energy to the bottom of deep boreholes, the system having: a source or high powered laser energy capable of providing a high power laser beam; a means for transmitting the laser beam from the high power laser to the bottom of a deep borehole; and, a means for monitoring and detecting adverse optical conditions in the transmission of the high power laser energy.

Yet still additionally, there is provided a method of monitoring and detecting conditions in the transmission of a high power laser beam having a power of greater than about 10 kW, in a high power laser system having an operational beam path, by sampling light from along a plurality of locations along the operation beam path and analyzing the sampled light to determine a condition of the operation beam path.

DESCRIPTION OF THE PREFERRED EMBODIMENTS

Figure 1:
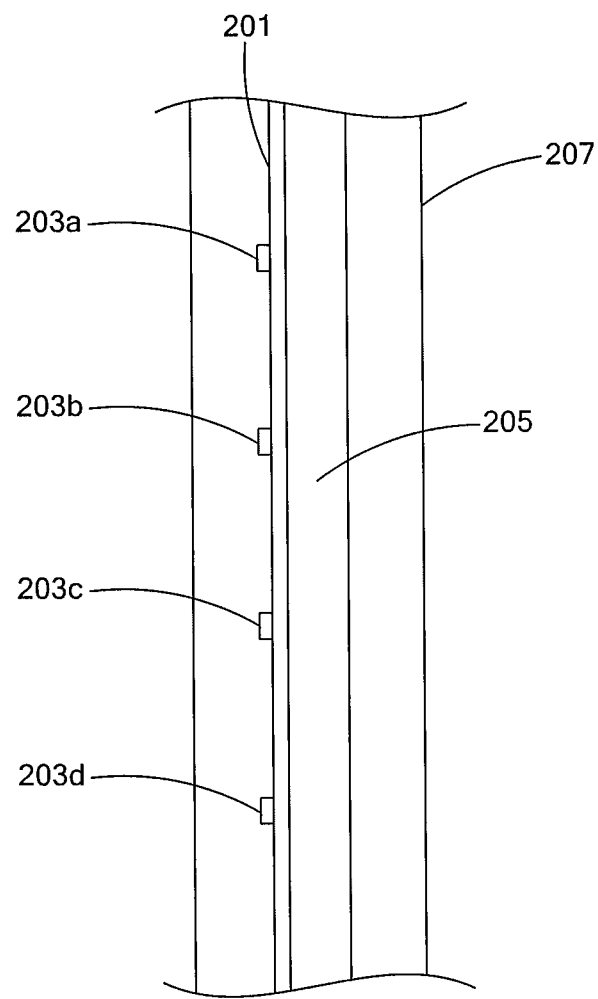
FIG. 1 is a schematic of an embodiment of a monitoring and detection systems in accordance with the present invention.

The present inventions relate to systems and methods for monitoring fiber continuity and the efficacy of high power laser transmission through long distance fibers, such as by monitoring and detecting various conditions of the fiber, for example: breaks in the fiber, damage to the fiber, losses of continuity in the fiber, or unacceptable conditions that adversely affect the fibers ability to transmit high power laser energy over long distances without substantial power losses. In particular, the present inventions relate to such detection and monitoring systems for use with high power laser tools and systems for performing activities, such as, for example: ROV (remote operated vehicles) operations, laser-pig operations, subsea exploration, subsea activities, nuclear plant related activities, mining and the recovery of natural resources, drilling, workover, completion, cleaning, milling, perforating, monitoring, analyzing, cutting, welding, MWD (measuring while drilling), LWD (Logging while drilling), MWD/LWD, exploration and production of oil, natural gas and geothermal energy, assembling components, and other applications where the ability to provide high power laser energy to distant, remote and/or difficult to access locations may be beneficial.

In general, the present high power laser optical fiber monitoring and detection systems and methods address long distance high power laser energy transmission issues, over the entire optical path of the laser beam from the laser source to the laser tool, work piece or area where the high power laser operation is to take place, which path may be referred to as the "operational beam path". Thus, the present systems and methods can monitor and detect continuity issues and adverse optical conditions in optical fibers, optical cables, optical conveyance devices, fiber splices, optical connectors, optical couplers and any other optical component along the operational beam path.

The present detection means provide the ability to detect adverse fiber conditions, such as the degradation and/or failure of high power optical fibers, or other continuity issues that may occur along the operational beam path, in fibers having great lengths, e.g., as long as about 1,000 ft, as long as about 5,000 ft, as long as about 10,000 ft, as long as about 20,000 ft, as long as about 30,000 ft and greater and in operational beam paths having lengths as long as about 1,000 ft, as long as about 5,000 ft, as long as about 10,000 ft, as long as about 20,000 ft, as long as about 30,000 if and greater. It is noted that an operation beam path may have one, two, three, or several high power optical fibers, serially optically associated, e.g., by a fusion splice, parallel and combinations of both.

These adverse conditions, typically may occur in situations where the operational beam path is great, and thus, the fiber is deployed over great distances for providing high power laser energy to a remote location to perform a high power laser activity at that remote location, e.g., the end of the operational beam path. In such situations, where the distal end of these fibers are in remote and/or difficult to access locations, it may be difficult, if not impossible to directly observe or see if laser energy is being propagated from the fiber distal end, or if sufficient laser energy is being provided at that end. In general, as used herein the term "proximal end" of an optical fiber will refer to the end that is closest to the high power laser source when the fiber is in optical communication with the laser source, i.e., the end that is receiving the laser beam from the laser source. In general as used herein the term "distal end" of the optical fiber will refer to the end that is optically furthest away from the laser source when the fiber is in optical communication with the laser source.

The following examples are illustrative embodiments of the present inventions, are representative of the types of system and methods of the present inventions, and do not limit the scope of protection to be afforded the present inventions. Additionally, in a monitoring and detection system for a high power laser delivery system, combinations and variations of the embodiments of the following examples may be utilized. To the extent that monitoring fibers optics are employed they may be any type of optical fiber, that meets the environment conditions of deployment, for example, they may be telecommunication type fiber having a diameter of about 20 to about 250 µm.

EXAMPLE 1

In this embodiment a separate monitoring optical fiber is used, which is placed in close proximity to the high power optical fiber, along the length of the operational beam path, a portion of that path, the length of the high power optical fiber, or a portion of the length of the high power fiber. In this manner if the high power fiber is broken, or if high power laser energy escapes along the operational path, the high power laser energy and/or heat will quickly break the monitoring fiber at, or near, the location where the high power fiber break occurred or the high power laser energy escaped.

A monitoring optical signal is transmitted from the proximal end of the monitoring fiber to the distal end. At the distal end, and also preferably along the length of the monitoring fiber, optical devices maybe positioned. The optical devices cause backwards, i.e., in a distal to proximal direction, traveling signals to be returned to the proximal end, where they can be detected, analyzed and integrated into a laser system control network. An optical time-domain reflectometer (OTDR), a spectrometer, or an OTDR with a spectrometer may be used by way of example for the propagation and monitoring of the monitoring signal(s).

The backward reflection optical devices may be mirrors, gratings, and similar type devices. It also may be the end of the fiber, or components further distal to the end of the fiber providing a backwards propagating signal. Further, these devices can reflect the signal with no change, can vary or change the wavelength of the backwards signal, can modulate the signal of the backward reflection, or can otherwise alter that signal for the sake of providing a unique indication of, or signature for, the backward reflection device. Further, optical signals utilized with monitoring fibers may be in the mW ranges, µW ranges, W ranges and 100 W ranges. The power of this signal will depend upon the type of system utilized and other factors.

Thus, in an illustrative implementation of this embodiment, which is illustrated in FIG. 1, several backwards reflection devices 203a, 203b, 203c, 203d are optically associated with the monitoring fiber 201 at 100 foot intervals, with each device having a unique signature for its respective backward signal. In this manner as the unique backwards signals are monitored, the presence and/or absence of specific signals will detect a break in the high power fiber 205, which is contained in a protective outer member 207, e.g., a metal tube, and also provide the general location for the break of the high power fiber 205.

Further, multiple types of optical signals may be sent down the monitoring fiber, multiple and varied types of backward reflection devices may be used, multiple monitoring fibers may be used, and combinations and variations of these may be distributed along a portion of, and/or the entire length of a high power fiber and/or the operational beam path.

Additionally, a looped monitoring fiber may be employed. In this manner a signal would be sent down the monitoring fiber and the return of that signal, as opposed to backward reflected signals, would be monitored. Further, the loop may be placed for example around the outside of a protective shielding for the fiber, for example a metal tube. In this manner if the metal tube was breached by high power laser light the looped monitoring fiber would be broken and the signal disrupted. This type of system could be used in conjunction with monitoring fiber placed inside of the metal tube.

EXAMPLE 2

In this embodiment, a separate monitoring optical fiber is used, which is placed in optical proximity to the high power optical fiber, along the length of the operational beam path, a portion of that path, the length of the high power optical fiber, or a portion of the length of the high power fiber. In this manner light that is "leaked" from the high power fiber during operation can be received by the monitoring fiber. A change in this received light would indicate an event occurring along the operational beam path, and depending upon the nature of the change, may indicate a fiber break.

Either at the distal end of the monitoring fiber, or along its length, light emitted, e.g., leaking, from the sides of the high power optical fiber is received into the monitoring fiber and transmitted to the proximal end of the monitoring fiber where it can be detected, analyzed and integrated into a laser system control network. An OTDR, a spectrometer, or an OTDR with a spectrometer may be used by way of example for monitoring this signal. Additionally, specific changes in intensity and/or wavelength, or other characteristic, of the leaked light can be correlated to various optical events.

Additionally, the leaked light may be directly monitored by an electro-optical sensing device such a diode. In this case the diode detects the leaked light and transmits a signal based upon that light, which signal is then monitored and analyzed.

Figure 2:
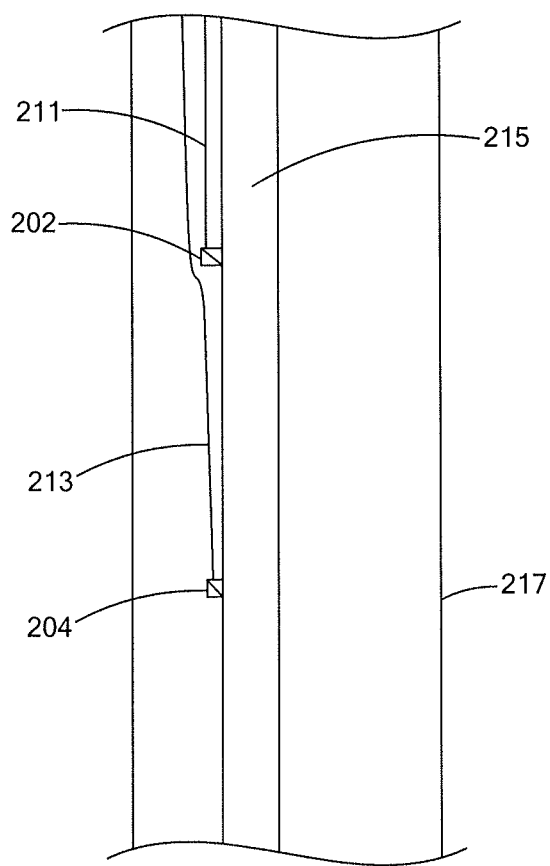
FIG. 2 is a schematic of an embodiment of a monitoring and detection systems in accordance with the present invention.

An illustrative illustration of this embodiment is provided in FIG. 2. Thus, there is a high power optical fiber 215 in a protective outer member 217. Within the protective outer member 217 and adjacent to the high power optical fiber 215 are two monitoring fibers 211, 213, which are associated with a collecting means 202, 204 to direct leaked light from the high power fiber 215 into the respective monitoring fibers 211, 213.

Further, multiple and varied types of optical devices or connections may be used to receive the leaked light, multiple monitoring fibers may be used, and combinations and variations of these may be distributed along a portion of, and/or the entire length of a high power fiber and/or the operational beam path.

EXAMPLE 3

In this embodiment, a separate monitoring optical fiber is used, which is placed in optical proximity to a fiber splice or specific optical components, such as an OSR (optical slip ring), that are in, or part of, the operational beam path. In this manner light that is "leaked" from the splice and/or device during operation can be received by the monitoring fiber. A change in this received light would indicate an invent occurring along the operational beam path, more particularly an event occurring in the splice or component, and depending upon the nature of the change, may indicate a fiber break, or that the component, for example is going out of optical alignment.

Either at the distal end of the monitoring fiber, or along its length, light emitted, e.g., leaking, from the splice or component is received into the monitoring fiber and transmitted to the proximal end of the monitoring fiber where it can be detected, analyzed and integrated into a laser system control network. An OTDR and an OTDR with a spectrometer may be used by way of example for monitoring this signal. Additionally, specific changes in intensity and/or wavelength, or other characteristic, of the leaked light can be correlated to various optical events.

Additionally, the leaked light may be directly monitored by an opto-electrical sensing device, such a photo diode. In this case the diode detects the leaked light and transmits a signal based upon that light, which signal is then monitored and analyzed.

Figure 3:
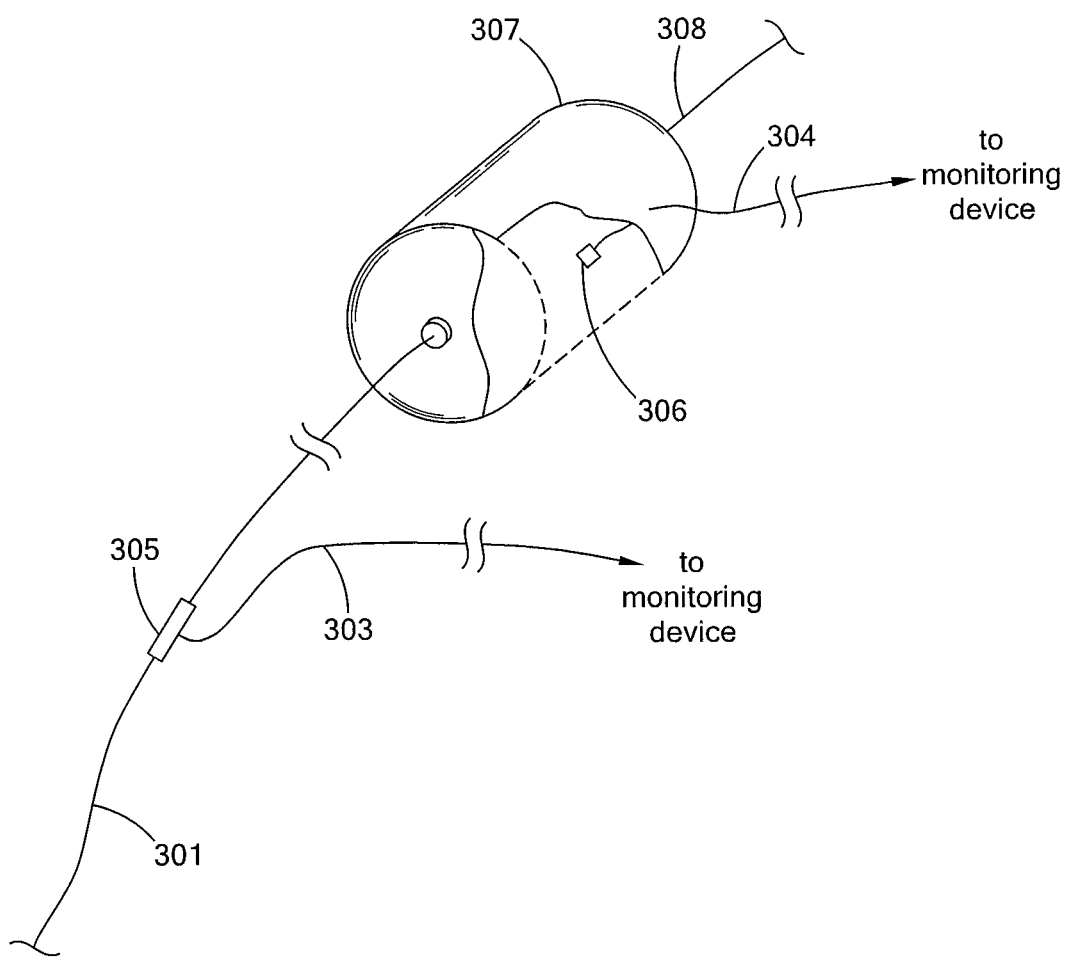
FIG. 3 is a schematic of an embodiment of a monitoring and detection systems in accordance with the present invention.

Turning to the embodiment of FIG. 3, there is provided a high power optical fiber 301 that is connected by way of fusion splice 305 to a high power optical fiber optically associated with an OSR 307. A monitoring fiber 303 is optically associated with splice 305. Within the OSR there is provided a photo-diode 306 that measures and/or detects reflections and/or leaked light, the diode has signal wire 304 leading to a monitoring device. A high power optical fiber 308 exits the OSR 307.

Further, multiple and varied types of optical devices or connections may be used to receive the leaked light, or to detect the light, multiple monitoring fibers may be used, and combinations and variations of these may be distributed along a portion of, and/or the entire length of a high power fiber and/or the operational beam path.

EXAMPLE 4

Figure 4:
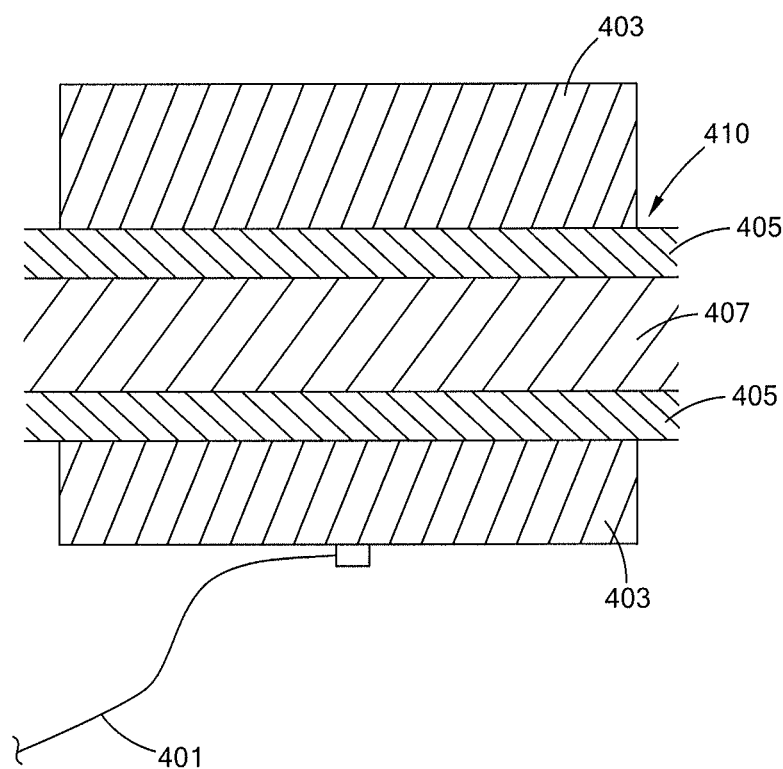
FIG. 4 is a schematic of an embodiment of a monitoring and detection systems in accordance with the present invention.

In this embodiment a cladding stripper device is used to intentionally remove light from the cladding of the high power optical cable. Such removal, may be done by way of a mode stripper, or other device. The removed light is then received by a monitoring fiber or an opto-electrical sensing device, such a photodiode. The signals and light from the monitored fiber are then analyzed. Thus, turning to the embodiment of FIG. 4, there is provided a section of a high power optical fiber 410 have a break detection and monitoring means associated with that section. The high power optical fiber has a core 407 surrounded by a cladding 405 (FIG. 4 is a cross-sectional schematic view). In optical association with the outer side of the cladding 405 is a cladding light stripper means 403, for example a mode stripper, a roughened surface of the cladding, an index matched material to the cladding index, or a material having a high index than the cladding index. In this manner, the cladding light stripper 403 strips light from the cladding and conveys it to monitoring fiber 401, where the presence, type, nature, amount of like stripped from the cladding may be analyzed and correlated to a condition along the operation beam path; and an appropriate action taken, such as for example, an emergency stop or shutting down the laser.

Further, multiple and varied types of optical devices or connections may be used to receive the leaked light, or to detect the light, multiple monitoring fibers may be used, and combinations and variations of these may be distributed along a portion of, and/or the entire length of a high power fiber and/or the operational beam path.

EXAMPLE 5

In this embodiment, separate monitoring fibers, or external opto-electrical detection devices are not required. A monitoring optical signal is sent from the proximal end of the high power laser fiber down the cladding and backward reflections of this signal would be created at specific points along the high power fiber. The creation of the backward reflection, may be by gratings in the cladding, or other similar means. This embodiment is preferably employed in double- or multi-clad high power fibers. The location of the backward reflection devices, their signatures and the monitoring of the backward reflections for this embodiment are along the lines of Example 1.

EXAMPLE 6

In this embodiment, separate monitoring fibers, or external opto-electrical detection devices are not required. In this embodiment back reflections that occur during the normal operation of the high power laser system are monitored and changes in those back reflections correlated to optical events, such as a fiber break.

EXAMPLE 7

In this embodiment, separate monitoring fibers, or external opto-electrical detection devices are not required. A monitoring optical signal is sent from the proximal end of the high power laser fiber down the core of the fiber monitored for either a reflection (break) or no reflection (no break) of the fiber. Further, if done at different wavelengths that do not adversely affect the transmission of the high power laser beam, backward reflections of the monitoring signal could be created at specific points along the high power fiber. The creation of the backward reflection, may be by gratings in the cladding, or other similar means. The location of the backward reflection devices, their signatures and the monitoring of the backward reflections for this embodiment are along the lines of Example 1.

In this embodiment a monitoring signal(s) can be sent along with the high power laser transmission down a single fiber, provided that they are all different wavelengths, using gratings or di-chroics to combine the beams at the surface, or proximal end of the high power fiber, and then similar optical devices can be used to separate out the different wavelengths at the distal end, or work area, e.g., down hole. The high power wavelength may be used for high power laser activities, such as drilling etc. The lower power wavelength may be used for monitoring activities, communications and/or diagnostics.

EXAMPLE 8

In this embodiment, separate monitoring fibers, or external opto-electrical detection devices may or may not be used. As the laser energy is directed to a work piece or surface by a high power laser tool, some of the laser energy will be reflected and additionally, light will be emitted from the surface as it is heated by the laser energy. The wavelength of the emitted light, the ratio of reflected to emitted light, the ratio of reflected to delivered light, and other properties of the light present at the work surface, may be analyzed, to determine fiber continuity and well as overall operation of the laser tool and the laser process. The emitted and/or reflected light may be transmitted from the distal end of the operation optical path back to a receiving and monitoring unit, e.g. an OTDR with a spectrometer, by way of the high power fiber, or by way of a separate monitoring fiber.

Although the foregoing examples use monitoring signals based upon light, it is contemplated that such signals may also be electrical, acoustical, hydraulic based, gas based, and/or pressure based signals. Moreover, the embodiments and their components, of the foregoing examples may used in conjunction with other monitoring devices and/or systems that monitor activities and conditions other than the high power laser beam and beam path. Thus, the embodiments and their components, of the foregoing examples may combine with pressure, temperature and shock detection and monitoring devices and systems. Additionally the same monitoring fiber could be used for these sensors, as well as, the high power laser sensors. The components, systems and operations provided in the various figures and embodiments set forth in this specification may be used with each other and the scope of protection afforded the present inventions should not be limited to a particular embodiment, configuration or arrangement that is set forth in a particular example or a particular embodiment in a particular Figure.

Many other uses for the present inventions may be developed or released and thus the scope of the present inventions is not limited to the foregoing examples of uses and applications. Thus, for example, in addition to the forgoing examples and embodiments, the implementation of the present inventions may also be utilized in laser systems for hole openers, perforators, reamers, whipstocks, and other types of boring tools.

The present inventions may be embodied in other forms than those specifically disclosed herein without departing from its spirit or essential characteristics. The described embodiments are to be considered in all respects only as illustrative and not restrictive.

Figure 5:
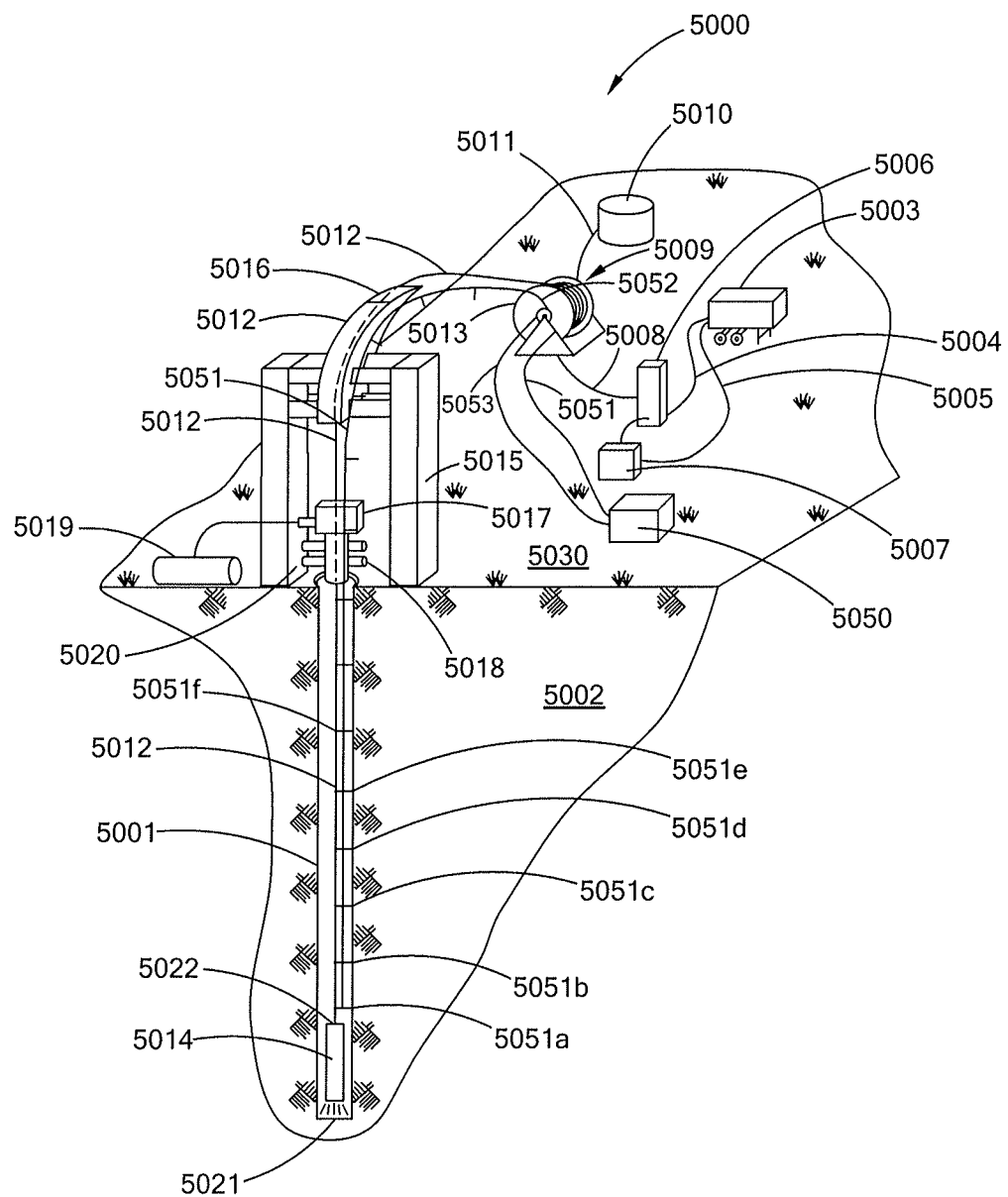
FIG. 5 is a schematic of an embodiment of a monitoring and detection systems in accordance with the present invention.

In FIG. 5 there is provided a schematic of an embodiment of a high power laser drilling workover and completion system deployed in the field for use in drilling activities, and which may utilize the break detection methods and systems of the present invention. A control system as disclosed and taught in the following U.S. Patent Applications: Ser. No. 61/446,412, and co-filed patent application U.S. Publication No. 2012/0248078, the entire disclosures of each of which are incorporated herein by reference, may be used with this break detection system and drilling system. The control system may be expanded, or networked with other control systems, to provide an integrated control network for some, or all of the components disclosed in that deployment.

Thus, the laser drilling system 5000 is shown as deployed in the field in relation to the surface of the earth 5030 and a borehole 5001 in the earth 5002. There is also an electric power source 5003, e.g. a generator, electric cables 5004, 5005, a laser 5006, a chiller 5007, a laser beam transmission means, e.g., an optical fiber, optical cable, or conveyance device 5008, a spool or real 5009 (or other handing device) for the conveyance device, a source of working fluid 5010, a pipe 5011 to convey the working fluid, a down hole conveyance device 5012, a rotating optical transition device 5013 (e.g., an OSR), a high power laser tool 5014, a support structure 5015, e.g., a derrick, mast, crane, or tower, a handler 5016 for the tool and down hole conveyance device, e.g., an injector, a diverter 5017, a BOP 5018, a system to handle waste 5019, a well head 5020, a bottom 5021 of the borehole 5001, and a connector 5022.

The monitoring and detection system for the system 5000 has a monitoring device 5050, which has monitoring fibers 5051, and signal wire 5053 entering the OSR 5013. The signal wire 5053 is connected to a photodiode 5052 that is within the OSR 5013. A monitoring fiber 5051 leaves the OSR 5013 and is associated with the conveyance device 5008, and preferably adjacent to the high power laser fiber. The monitoring fiber has a plurality of backward reflection devices, e.g., 5051a, 5051b, 5051c, 5051d, 5051e, 5051f.

In addition to the injector, gravity, pressure, fluids, differential pressure, buoyancy, a movable packer arrangement, and tractors, other motive means may be used to advance the downhole tool to its location of operation, such as for example to a predetermined location in a borehole, for example, the bottom of the borehole so that it may be laser-mechanically drilled to drill and advance the borehole.

The optical cable, preferably is a line structure, which may have multiple channels for transporting different materials, cables, or lines to a laser tool such as an electric motor laser bottom hole assemble, a laser cutting tool, a laser drilling tool, and a laser bottom hole assembly. Examples of such laser tools are disclose and taught in the following U.S. patent applications and U.S. Patent Application Publications: U.S. 2010/0044106 (issued as U.S. Pat. No. 8,511,401), U.S. 2010/0044104 (issued as U.S. Pat. No. 8,820,434), U.S. 2010/0044105 (issued as U.S. Pat. No. 8,424,617), Ser. Nos. 13/211,729, 13/222,931, 13/347,445, 13/366,882, 12/896, 021 (issued as U.S. Pat. No. 8,627,901) and Ser. No. 61/446, 042, the entire disclosures of each of which are incorporated herein by reference. The channels may be in, on, integral with, releasably connected to, or otherwise associated with the line structure, and combinations and variations of these. Further examples of optical fibers, optical cables, connectors and conveyance structures are disclosed and taught in the following U.S. Patent Applications and U.S. Patent Publications: Publication No. U.S. 2010/0044106 (issued as U.S. Pat. No. 8,511,401), Publication No. 2010/0215326, Publication No. 2012/0020631 (issued as U.S. Pat. No. 8,571,368), Ser. No. 13/210,581 (issued as U.S. Pat. No. 8,662,160), and Ser. No. 61/493,174, the entire disclosures of each of which are incorporated herein by reference.

In general, an optical assembly, an optical package, an optical component and an optic, that may be utilized with high power laser tools and systems, may be generally any type of optical element and/or system that is capable of handling the laser beam (e.g., transmitting, reflecting, etc. without being damaged or quickly destroyed by the beams energy), that is capable of meeting the environmental conditions of use (e.g., down hole temperatures, pressures, vibrates, etc.) and that is capable of effecting the laser beam in a predetermined manner (e.g., focus, de-focus, shape, collimate, power distribution, steer, scan, etc.). Further examples of optical assemblies, optical packages, optical components and optics are disclosed and taught in the following U.S. patent applications and U.S. Patent Application Publications: U.S. 2010/0044105 (issued as U.S. Pat. No. 8,424,617), U.S. 2010/0044104 (issued as U.S. Pat. No. 8,820,434), Ser. Nos. 13/222,931, 61/446,040, 61/446,312 and co-filed U.S. patent application Publication No. U.S. 2012/0275159 filed contemporaneously herewith, the entire disclosures of each of which are incorporated herein by reference.

In these methods, tools, systems and applications, the laser beam, or beams, may for example have 10 kW, 20 kW, 40 kW, 80 kW or more power; and have a wavelength in the range of from about 445 nm (nanometers) to about 2100 nm, preferably in the range of from about 800 to 1900 nm, and more preferably in the ranges of from about 1530 nm to 1600 nm, from about 1060 nm to 1080 nm, and from about 1800 nm to 1900 nm. Further, the types of laser beams and sources for providing a high power laser beam may be the devices, systems, optical fibers and beam shaping and delivery optics that are disclosed and taught in the following U.S. Patent Applications and U.S. Patent Application Publications: Publication No. U.S. 2010/0044106 (issued as U.S. Pat. No. 8,511,401), Publication No. U.S. 2010/0044105 (issued as U.S. Pat. No. 8,424,617), Publication No. U.S. 2010/0044103 (issued as 8,826,973), Publication No. U.S. 2010/0044102 (issued as U.S. Pat. No. 8,836,085), Publication No. U.S. 2010/0215326, Publication No. 2012/0020631 (issued as U.S. Pat. No. 8,571,368), Ser. No. 13/210,581 (issued as 8,662,160), and Ser. No. 61/493,174, the entire disclosures of each of which are incorporated herein by reference. The high power lasers for example may be fiber lasers or semiconductor lasers having 10 kW, 20 kW, 50 kW or more power and, which emit laser beams with wavelengths preferably in about the 1064 nm range, about the 1070 nm range, about the 1360 nm range, about the 1455 nm range, about the 1550 nm range, about the 1070 nm range, about the 1083 nm range, or about the 1900 nm range (wavelengths in the range of 1900 nm may be provided by Thulium lasers). Thus, by way of example, there is contemplated the use of four, five, or six, 20 kW lasers to provide a laser beam in a bit having a power greater than about 60 kW, greater than about 70 kW, greater than about 80 kW, greater than about 90 kW and greater than about 100 kW. One laser may also be envisioned to provide these higher laser powers.

High powered optical cables, spools of cables, creels, connectors and reels of cables of the type disclosed and taught in the following U.S. Patent Applications and U.S. Patent Application Publications: 2010/0044104 (issued as U.S. Pat. No. 8,820,434), 2010/0044103 (issued as U.S. Pat. No. 8,826,973), 2010/0215326, 2012/0020631 (issued as U.S. Pat. No. 8,571,368), Ser. Nos. 13/366,882, 61/493,174 and Ser. No. 13/210,581 (issued as U.S. Pat. No. 8,662,160), the entire disclosures of each of which are incorporated herein by reference, may be used in conjunction with the present systems. Thus, the optical cable or the conveyance structure may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have other optical or metal fibers for the transmission of data and control information and signals; it may be any of the combinations set forth in the foregoing patents and combinations and variations thereof.

Figure 6:
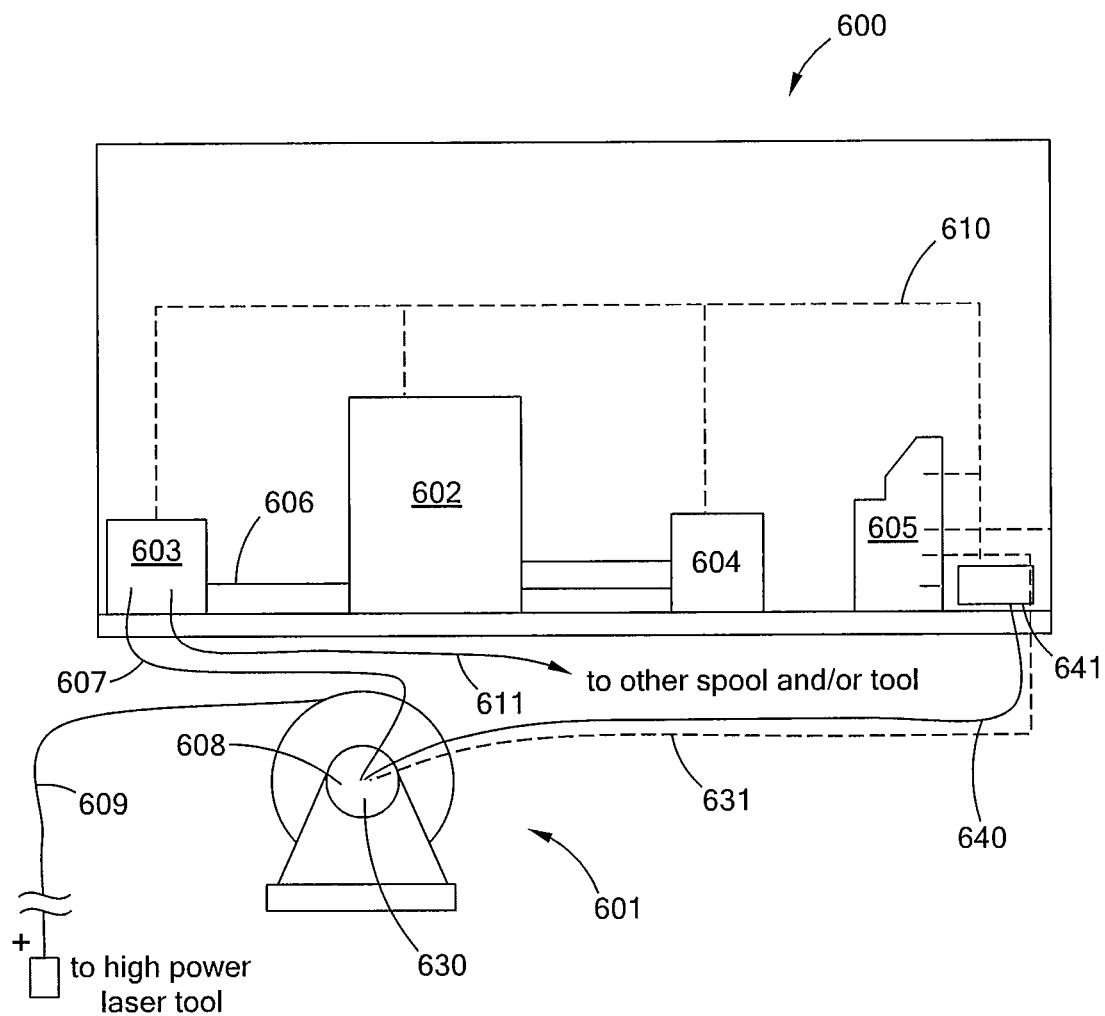
FIG. 6 is a schematic of an embodiment of a monitoring and detection systems in accordance with the present invention.

In FIG. 6 there is provided a schematic drawing of an embodiment of a laser room 600 and spool 601. That may be used in conjunction with a high power laser delivery system, for example of the type shown in FIG. 5. In the embodiment of FIG. 6 the laser room 600 contains a high power beam switch 603, a high power laser unit 602 (which could be a number of lasers, a single laser, or laser modules, collectively having at least about 5 kW, 10 kW, 20 kW, 30 kW 40 kW, 70 kW or more power), a chiller or connection to a chiller assembly 604 for the laser unit 602 and a control counsel 605 that preferably is in control communication with a control system and network 610. Additionally multiple laser may be combined with a high power beam combiner to launch about 40 kW, about 60 kW about 80 kW or greater down a single fiber. Preferably, the larger components of the chiller 604, such as the heat exchanger components, will be located outside of the laser room 600, both for space, noise and heat management purposes. The high power laser unit 602 is optically connected to the beam switch 603 by high power optical fiber 606. The beam switch 603 optically connects to spool 601 by means of a high power laser fiber 607 and an optical slip ring 608, which in turn optically and rotationally connects to the optical cable 609. In higher power systems, e.g., greater than 20 kW the use of multiple fibers, multiple beam switches, and other multiple component type systems may be employed. These will, among other things provide greater safety and reliability to such higher power systems. The optical cable is then capable of being attached to a high power laser tool. A second optical cable 611, which could also be just an optical fiber, leaves the beam switch 603. This cable 611 could be used with a different spool for use with a different tool, or directly connect to a tool. Electrical power can be supplied from the location where the laser room is located, from the mobile unit that transported the laser room, from separate generators, separate mobile generators, or other sources of electricity at the work site or bought to the work site.

The monitoring and break detection system for the system 600, has an OTDR 641 in communication with the control network 610. The OTDR has a monitoring fiber 640 that is optically associated with the OSR 608. A signal wire 631 is connected to a photodiode 630, with in or on the OSR 608.

The signal wire 631 is connected to the network, either directly or through the OTDR 641.

In another example a distributed temperature sensing fiber with sequential bragg gratings for monitoring the temperature and pressure along the entire fiber and detecting anomalies in the temperature of the fiber and its armor is utilized. This fiber may be the high power transmission fiber, a separate fiber adjacent to the high power transmission fiber, or a separate fiber removed from the high power transmission fiber but in detection range of the high power transmission fiber, e.g., within the conveyance structure but outside of a protective member around the high power transmission fiber.

There may also be employed a fiber with gratings sequentially positioned along the fiber to collect light from the optical fiber along the length of the fiber and transmit it back to the top of the hole to allow continuous monitoring of the light leaking out of the fiber and allowing any anomaly to be detected prior to a failure. In this manner the high power transmission fiber functions as the monitoring fiber as well. A detection device, such as spectrometer may be utilized to analyze the light leaking out of the fiber and provide a basis for a correlation to the condition of the system.

In a break detection and monitoring system there may also be utilized a spectrometer monitoring the back reflection signal on the fiber. Thus, in the event of a failure of an optic or the fiber the wavelength of laser light back-reflected along the fiber is greatly enhanced and can be used to detect remotely when a failure has occurred downhole. This system could have a thin foil packaged adjacent to the optical fiber to conduct an electrical signal to the bottom of the hole and the stainless steel tube encapsulating the fiber would be used as the return for the interlock signal. This system may also employ two thin foils that are packaged adjacent to the optical fiber in the metal tube and connected at the bottom of the hole to the connector switch, which indicates the connector (examples of connectors are disclosed in U.S. Patent Application Ser. No. 61/493,174) is seated. Additionally, a thermal switch may be included in the connector housing connected in series with the thin foils for the purpose of stopping the laser in the event of an overheat situation in the connector. The thermal switch provides additional protection to the downhole optic system preventing additional damage and propagation of damage through the umbilical or conveyance structure.

Thus, for example, a spectrometer may be used to monitor a backreflected signal from a tool at the distal end of the fiber. A controller, computer, the spectrometer or other device may then integrate the backreflected signal over different wavelength regions to look for characteristic spectral signatures that indicate damage to optics and the fiber, or other components along the optical paths. Also, a method using a spectrometer to monitor the back reflected signal from the tool at the distal end of the fiber and monitoring the magnitude of the backreflected signal at the laser wavelength and using that to detect the onset of damage to the optics and the fiber, may be employed.

Preferably in a high power laser system a controller is in communication, via a network, cables fiber or other type of factory, marine or industrial data and control signal communication medium with the laser tool and potentially other systems at a work site. The controller may also be in communication with a first spool of high power laser cable, a second spool of high power laser cable and a third spool of high power laser cable, etc. The monitoring and detection systems would preferably be integrated into the control network.

One or more high power optical fibers, as well as, lower power optical fibers may be used or contained in a single cable that connects the tool to the laser system, this connecting cable could also be referred to herein as a tether, an umbilical, wire line, or a line structure. The optical fibers may be very thin on the order of hundreds e.g., about greater than 100, of μm (microns). These high power optical fibers have the capability to transmit high power laser energy having many kW of power (e.g., 5 kW, 10 kW, 20 kW, 50 kW or more) over many thousands of feet. The high power optical fiber further provides the ability, in a single fiber, although multiple fibers may also be employed, to convey high power laser energy to the tool, convey control signals to the tool, and convey back from the tool control information and data (including video data). In this manner the high power optical fiber has the ability to perform, in a single very thin, less than for example 1000 μm diameter fiber, the functions of transmitting high power laser energy for activities to the tool, transmitting and receiving control information with the tool and transmitting from the tool data and other information (data could also be transmitted down the optical cable to the tool). As used herein the term "control information" is to be given its broadest meaning possible and would include all types of communication to and from the laser tool, system or equipment.

The tools that are useful with high power laser systems, and which can incorporate or utilize the optical assemblies described herein, many generally be laser drills, laser bottom hole assemblies, laser cutters, laser cleaners, laser monitors, laser welders and laser delivery assemblies that may have been adapted for a special use or uses. Configurations of optical elements for collimating and focusing the laser beam can be employed with these tools to provide the desired beam properties for a particular application or tool configuration.

Such tools for example may be used for drilling cleaning, resurfacing, removal, and clearing away of unwanted materials, e.g., build-ups, deposits, corrosion, or substances, in, on, or around a structures, e.g. the work piece, or work surface area. Such unwanted materials would include by way of example rust, corrosion, corrosion by-products, degraded or old paint, degraded or old coatings, paint, coatings, waxes, hydrates, microbes, residual materials, biofilms, tars, sludges, and slimes.

The invention may be embodied in other forms than those specifically disclosed herein without departing from its spirit or essential characteristics. The described embodiments are to be considered in all respects only as illustrative and not restrictive.

What is claimed:

1. A system for advancing a borehole in hard rock, the system comprising:
   a. a source of high power laser energy, the laser source capable of providing a laser beam having at least 20 kW of power;
   b. a laser bottom hole assembly;
   c. a high power optical fiber placing the laser bottom hole assembly in optical communication with the laser source thereby defining an operational beam path; the optical fiber having a length of at least about 1,000 feet; and,
   d. a means for monitoring and detecting a condition of the high power laser energy along the high power optical fiber and thereby along the operational beam path,
   wherein the means for monitoring and detecting comprises a plurality of light detecting devices that are distributed along the high power optical fiber and in optical proximity to the high power optical fiber,
   wherein the plurality of light detecting devices is capable of detecting light leaked from the high power optical fiber and sends a signature indicating a location and the condition of the high power optical fiber to a monitoring device via a monitoring fiber.

2. The system of claim 1. Wherein the operational beam path is at least about 5,000 feet long.

3. The system of claim 1, wherein the monitoring and detecting means comprises a leak detector associated with a fusion splice.

4. The system of claim 1, wherein the monitoring and detecting means comprises a plurality of light detecting devices, associated with a monitoring fiber, wherein the monitoring fiber is associated with an optical time-domain reflectometer (OTDR), whereby the light transmitted by a light detecting device is analyzed and correlated to a condition along the operation beam path.

5. The system of claim 1, wherein the monitoring device receives light transmitted by the plurality of light detecting devices, analyzes and correlates to the condition along the operation beam path.

6. The system of claim 5, wherein the light transmitted by the plurality of light detecting devices comprises high power laser back reflections.

7. The system of claim 1, wherein the monitoring and detecting means comprises a fiber splice and an optical slip ring (OSR) comprising a photodiode, and wherein the OSR is placed in close proximity to the fiber splice.

8. The system of claim 7, wherein the photodiode is electrically associated with the monitoring and detecting means via a signal wire.

9. The system of claim 1, wherein the monitoring and detecting means comprises a distributed temperature sensing fiber with sequential bragg gratings for monitoring temperatures along the operational beam path and detecting anomalies in the temperatures.

10. The system of claim 1, wherein the monitoring and detecting means comprise a fiber having gratings sequentially positioned along a length of the fiber, wherein the gratings are configured to collect light and transmit the collected light to the monitoring device to detect an anomaly prior to a failure.

11. The system of claim 1, wherein the plurality of light detecting devices are a plurality of backward reflection devices.

12. The system of claim 11, wherein the plurality of backward reflection devices are minors, gratings, and a combination of mirrors and gratings.

13. The system of claim 1, wherein the plurality of light detecting devices modulate or alter an optical signal to provide the unique signature.

14. The system of claim 1, wherein plurality of light detecting devices are disclosed at 100 foot intervals.

15. The system of claim 1, further comprises a cladding stripper device configured to remove light from a cladding of the high power optical fiber.

16. The system of claim 15, wherein the removed light is optically transmitted to the monitoring device via the monitoring fiber.

17. A system for monitoring an operational high power laser beam path associated with a high power laser drilling system, the system comprising:
   a. a monitoring fiber associated with a high power laser fiber;
   b. the monitoring fiber having a plurality of light detection devices positioned along the high power laser fiber and in optical proximity to the high power laser fiber; and,
   c. a monitoring device in optical association with the monitoring fiber;
   d. wherein high power laser beam is transmitted through the high power laser fiber to a high power laser tool, and wherein the plurality of light detection devices are capable of detecting light leaked from the high power laser fiber,
   wherein the plurality of light detection devices is optically associated with the monitoring device via the monitoring fiber and sends a signature indicating a location and the condition of the operational high power laser beam to the monitoring device via the monitoring fiber.

* * * * *